US012802396B2

(12) United States Patent
Uno et al.

(10) Patent No.: US 12,802,396 B2
(45) Date of Patent: Nov. 17, 2026

(54) INFORMATION PROCESSING APPARATUS, INFORMATION PROCESSING METHOD, AND NON-TRANSITORY COMPUTER READABLE MEDIUM

(71) Applicant: FUJIFILM BUSINESS INNOVATION CORP., Tokyo (JP)

(72) Inventors: Miho Uno, Kanagawa (JP); Jungo Harigai, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/316,685

(22) Filed: May 12, 2023

(65) Prior Publication Data

US 2024/0087283 A1 Mar. 14, 2024

(30) Foreign Application Priority Data

Sep. 9, 2022 (JP) ................................ 2022-143496

(51) Int. Cl.

*G06V 10/60* (2022.01)
*G06V 10/44* (2022.01)
*G06V 10/74* (2022.01)

(52) U.S. Cl.

CPC .............. *G06V 10/60* (2022.01); *G06V 10/44* (2022.01); *G06V 10/761* (2022.01)

(58) Field of Classification Search

None
See application file for complete search history.

(56) References Cited

U.S. PATENT DOCUMENTS

| | | | | |
|---|---|---|---|---|
| 5,057,913 A * | 10/1991 | Nagata | G03B 15/003 | 358/302 |
| 5,999,175 A * | 12/1999 | Nalder | H04N 1/4072 | 358/1.18 |
| 6,798,536 B1 * | 9/2004 | Muramoto | H04N 1/4072 | 358/1.9 |
| 7,221,807 B2 * | 5/2007 | Campbell | H04N 1/6005 | 358/448 |
| 7,266,240 B2 * | 9/2007 | Matsuda | H04N 9/3185 | 353/69 |
| 7,372,990 B2 * | 5/2008 | Yamauchi | G06T 9/001 | 382/167 |
| 7,646,880 B2 * | 1/2010 | Kamada | G06T 15/04 | 382/167 |
| 7,973,950 B1 * | 7/2011 | Tieskoetter | G06F 3/1205 | 358/1.9 |

(Continued)

FOREIGN PATENT DOCUMENTS

| | | |
|---|---|---|
| JP | 5865092 B2 | 2/2016 |
| JP | 2021-149679 A | 9/2021 |

*Primary Examiner* — Sath V Perungavoor
(74) *Attorney, Agent, or Firm* — Oliff PLC

(57) ABSTRACT

An information processing apparatus includes a processor configured to: acquire a feature amount related to brightness distribution from a first image captured at an observation location; select an environment light map that is similar to the feature amount, from among plural environment light maps prepared in advance; and control expression of a second image corresponding to an article observed at the observation location using the selected environment light map.

7 Claims, 33 Drawing Sheets

(56) References Cited

U.S. PATENT DOCUMENTS 8,135,214 B2 * 3/2012 Enjuji .................... H04N 9/643 358/518
8,355,574 B2 * 1/2013 Imai ....................... G06V 20/10 382/167
8,363,270 B2 * 1/2013 Hanamoto ........... H04N 1/6097 358/1.9
8,472,748 B2 * 6/2013 Jang .......................... G06T 5/92 358/518
8,797,321 B1 * 8/2014 Bertolami ............... G06T 15/50 345/426
8,994,882 B2 * 3/2015 Seshadrinathan ...... H04N 19/14 348/625
9,459,820 B2 * 10/2016 Yoshida ................ G06F 3/1256
10,559,121 B1 * 2/2020 Moudgil ................. G06T 15/50
10,607,567 B1 * 3/2020 Schritter .................. G09G 5/06
10,665,011 B1 * 5/2020 Sunkavalli .............. G06T 15/50
10,885,701 B1 * 1/2021 Patel ....................... A63F 13/57
10,922,878 B2 * 2/2021 Neulander .............. G06T 15/80
11,403,831 B1 * 8/2022 Smith ..................... G06T 19/20
11,494,953 B2 * 11/2022 Murillo ................... G06T 11/10
2003/0053689 A1 * 3/2003 Watanabe ............ H04N 1/6027 382/167
2004/0213457 A1 * 10/2004 Mori ......................... G06T 5/92 382/167
2005/0151743 A1 * 7/2005 Sitrick ................... G09G 5/377 345/670
2005/0163368 A1 * 7/2005 Hanamoto ................ G06T 5/92 382/168
2005/0195212 A1 * 9/2005 Kurumisawa ........... G01J 3/462 345/604
2007/0081721 A1 * 4/2007 Xiao ......................... G06T 5/40 348/E5.073
2007/0091341 A1 * 4/2007 Yamada ................. G06K 15/02 358/1.12
2009/0141977 A1 * 6/2009 Hong ........................ G06T 5/94 382/167
2009/0167671 A1 * 7/2009 Kerofsky ............. G09G 3/3413 345/102
2009/0167672 A1 * 7/2009 Kerofsky ............. G09G 3/3413 382/168
2009/0195551 A1 * 8/2009 Quan ....................... G09G 5/02 345/600
2010/0007599 A1 * 1/2010 Kerofsky ............. G09G 3/3611 345/102
2010/0053222 A1 * 3/2010 Kerofsky ............. G09G 3/3406 345/690
2010/0195902 A1 * 8/2010 Horovitz ................ H04N 1/603 382/162
2011/0019035 A1 * 1/2011 Satodate .............. H04N 25/633 348/E5.079
2011/0022396 A1 * 1/2011 Van De Sluis ........ H05B 47/12 382/164
2011/0188775 A1 * 8/2011 Sun ........................... G06T 5/50 382/274
2011/0292070 A1 * 12/2011 Hasegawa ............ H04N 1/6011 345/590
2011/0304863 A1 * 12/2011 Shibuya ............... H04N 1/6097 358/1.9
2012/0032973 A1 * 2/2012 Sano ..................... G06T 15/506 345/593
2012/0218574 A1 * 8/2012 Fukuda ................ H04N 1/6033 358/1.9
2013/0141434 A1 * 6/2013 Sugden .............. G02B 27/0172 345/426
2015/0146038 A1 * 5/2015 Donohoe ............... H04N 23/88 348/251
2016/0065790 A1 * 3/2016 Matsunaga .......... G06K 15/102 358/1.9
2016/0171753 A1 * 6/2016 Park ........................ G06T 15/50 345/420
2016/0306533 A1 * 10/2016 Agarwal ............. G06F 3/04845
2016/0381337 A1 * 12/2016 Hochman .............. H05B 45/20 348/603
2019/0149693 A1 * 5/2019 Cao ........................ H04N 23/88 382/167
2019/0172384 A1 * 6/2019 Nonomura ........... G09G 3/2018
2019/0228568 A1 * 7/2019 Wu ....................... G06T 15/506
2019/0279549 A1 * 9/2019 Shin ..................... G09G 3/2007
2020/0319756 A1 * 10/2020 Kozakura ........... G06F 3/04847
2023/0098115 A1 * 3/2023 Sunkavalli ................ G06T 7/90 345/426
2024/0007582 A1 * 1/2024 Kwong .................. H04N 5/262
2024/0080555 A1 * 3/2024 Fitzpatrick ............... H04N 9/69
2024/0193724 A1 * 6/2024 Gharbi .................. G06T 3/4038
2024/0412557 A1 * 12/2024 Bu ......................... G06V 10/25

* cited by examiner

*Ai (i = 1, 2 ...), Bi (i = 1, 2 ...), AND Ci (i = 1, 2 ...) HAVE DIFFERENT AVERAGE BRIGHTNESSES

*Ai (i=1, 2 ...), Bi (i=1, 2 ...), AND Ci (i=1, 2 ...) HAVE DIFFERENT CHROMATICITIES

FIG. 17

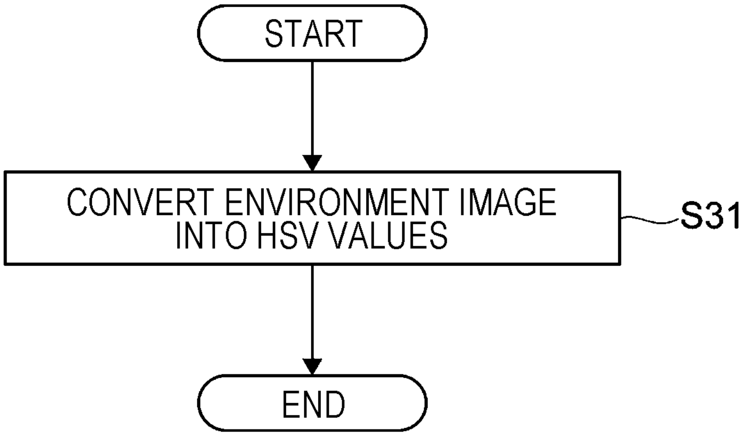

$$H = \begin{cases} \text{undefined}, & \text{if MIN} = \text{MAX} \\ 60 \times \frac{G-R}{\text{MAX}-\text{MIN}} + 60, & \text{if MIN} = B \\ 60 \times \frac{B-G}{\text{MAX}-\text{MIN}} + 180, & \text{if MIN} = R \\ 60 \times \frac{R-B}{\text{MAX}-\text{MIN}} + 300, & \text{if MIN} = G \end{cases}$$

$$S = \text{MAX-MIN} \quad \text{(FOR CONICAL MODEL)}$$

$$= \frac{\text{MAX-MIN}}{\text{MAX}} \quad \text{(FOR CYLINDRICAL MODEL)}$$

$$V = \text{MAX}$$

MAXIMUM VALUE AND MINIMUM VALUE OF R, G, AND B VALUES ARE DEFINED AS MAX AND MIN, RESPECTIVELY.

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-143496 filed Sep. 9, 2022.

BACKGROUND

(i) Technical Field

The present disclosure relates to an information processing apparatus, an information processing method, and a non-transitory computer readable medium.

(ii) Related Art

There is a difference in illumination between an environment in which a designer etc. prepares an image and an environment in which printed matter obtained by printing the prepared image is observed. This difference may render how the printed matter looks in terms of color or gloss different from that intended by the designer etc. Similar mismatches are also caused for industrially manufactured products.

A related technique is disclosed in Japanese Unexamined Patent Application Publication No. 2021-149679.

SUMMARY

When an omnidirectional image (hereinafter referred to as an "environment light map") that includes illumination information at an observation location has been prepared in advance, it is possible to simulate how an article would look in terms of color or gloss at the observation location.

However, it takes a lot of trouble and a lot of time to prepare an environment light map. Therefore, it is not practical to prepare an environment light map for a desired observation location.

Aspects of non-limiting embodiments of the present disclosure relate to easily reproducing how an article would look at an observation location, an environment light map for which is not available, rather than when an environment light map for an observation location has been prepared in advance.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: acquire a feature amount related to brightness distribution from a first image captured at an observation location; select an environment light map that is similar to the feature amount, from among a plurality of environment light maps prepared in advance; and control expression of a second image corresponding to an article observed at the observation location using the selected environment light map.

BRIEF DESCRIPTION OF THE DRAWINGS

Exemplary embodiments of the present disclosure will be described in detail based on the following figures, wherein:

FIG. 17 is a flowchart illustrating an example of process operation executed by a chromaticity calculation section that is used in the third exemplary embodiment;

DETAILED DESCRIPTION

Exemplary embodiments of the present disclosure will be described below with reference to the drawings.

First Exemplary Embodiment

<System Configuration>

Figure 1:
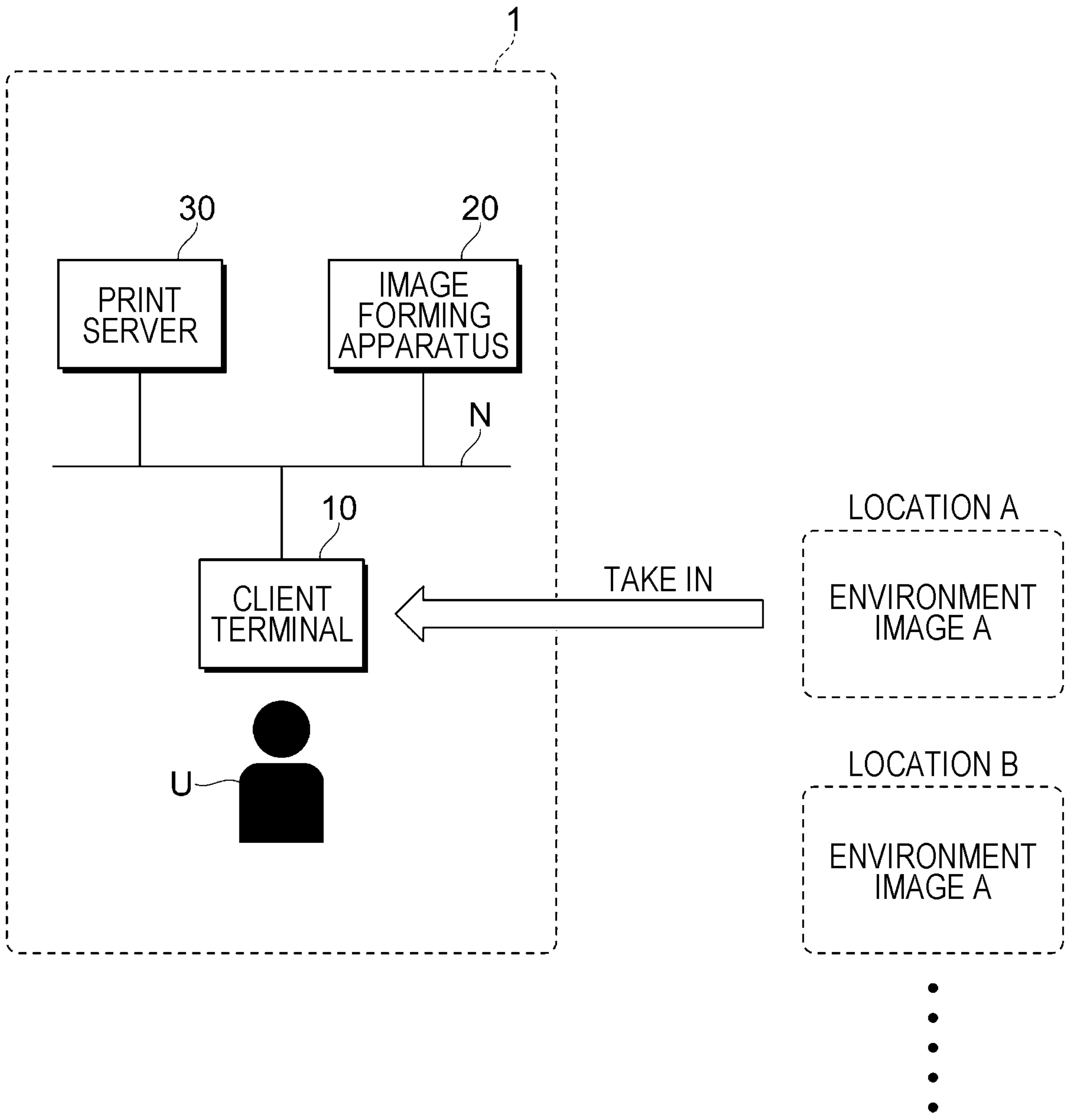
FIG. 1 illustrates an example of the configuration of a print system that is used in a first exemplary embodiment.

FIG. 1 illustrates an example of the configuration of a print system 1 that is used in a first exemplary embodiment.

The print system 1 illustrated in FIG. 1 is composed of a client terminal 10, an image forming apparatus 20, and a print server 30. These terminals are communicably connected to each other by way of a network N.

Each of the client terminal 10, the image forming apparatus 20, and the print server 30 is an example of an information processing apparatus.

The client terminal 10 and the print server 30 are basically constituted of a computer. The image forming apparatus 20 and the print server 30 may be connected to each other through a dedicated line.

The image forming apparatus 20 is a device that forms an image on a recording medium such as paper. A recording material such as a toner or an ink is used to form an image. The colors of the recording material include yellow (Y), magenta (M), cyan (C), and black (K) which are called basic colors, and metallic colors and fluorescent colors which are called special colors.

The client terminal 10 may be a desktop computer, a laptop computer, a tablet computer, a smartphone, or a wearable computer, for example. In the present exemplary embodiment, the client terminal 10 is exclusively used as an input/output device.

The image forming apparatus 20 according to the present exemplary embodiment may be a production printer, a printer for office use, or a printer for home use, for example. The image forming apparatus 20 may be provided with not only a print function but also a scanner function. The print function may use a print method corresponding to electrophotography or a print method corresponding to an inkjet system.

The print server 30 according to the present exemplary embodiment is provided with a function of receiving a print job from the client terminal 10 and outputting the print job to the image forming apparatus 20, and a function of reproducing how an article would look at an observation location.

The phrase "how an article would look" refers to an impression (so-called "texture") that the color or the gloss of the article would give to people. The color and the gloss are affected by irregularities on a surface, the direction of a normal to the surface and the direction of incident illumination light, the intensity of the illumination light, the color of the illumination light, etc.

The print server 30 according to the present exemplary embodiment receives an image (hereinafter referred to as an "environment image") obtained by capturing an observation location and information on an article as a target of reproduction as to how it would look from the client terminal 10, and reproduces how the article would look in a posture specified by a user through a computer technology. Examples of the information on an article include a three-dimensional shape, and a fine structure, a pattern, and a color of a surface.

The environment image is uploaded from the client terminal 10 to the print server 30, for example. The print server 30 may download the environment image specified from the client terminal 10 from the Internet etc., or may read the environment image from a data storage.

In FIG. 1, an environment image captured at a location A is defined as an "environment image A", and an environment image captured at a location B is defined as an "environment image B".

Examples of the environment image according to the present exemplary embodiment include an omnidirectional image, an upper hemisphere image, and a planar image.

The upper hemisphere image refers to an upper half of the omnidirectional image above the equator. It is not necessary that the upper hemisphere image should strictly be an image obtained by capturing a range from the equator to the zenith, and the upper hemisphere image may be an image obtained by capturing a range from a certain latitude to the zenith.

The planar image refers to a two-dimensional image for a specific angle of view captured by a camera of a smartphone etc.

The observation location is a location at which an article is expected to be observed, and is assumed to be a specific booth at an exhibition site, an exhibition room, a conference room, etc., for example. The booth is a space defined by partitions etc. The observation location is not limited to an indoor environment, and may be an outdoor environment.

Even for the same article, different textures may be observed when the intensity or the color of illumination light is different. Even when the intensity or the color of illumination light is the same, different textures may be observed when the direction of incident illumination light and the direction of a normal to the surface of the article are different.

The network N in FIG. 1 is assumed to be a local area network (LAN). The network N may be a wired network or a wireless network. Ethernet (registered trademark), for example, may be used as the wired network. Wi-Fi (registered trademark), for example, may be used as the wireless network.

While one client terminal 10, one image forming apparatus 20, and one print server 30 are connected to the network N of the print system 1 illustrated in FIG. 1, a plurality of client terminals 10, image forming apparatuses 20, or print servers 30 may be provided.

<Terminal Configuration>

<Hardware Configuration of Print Server>

Figure 2:
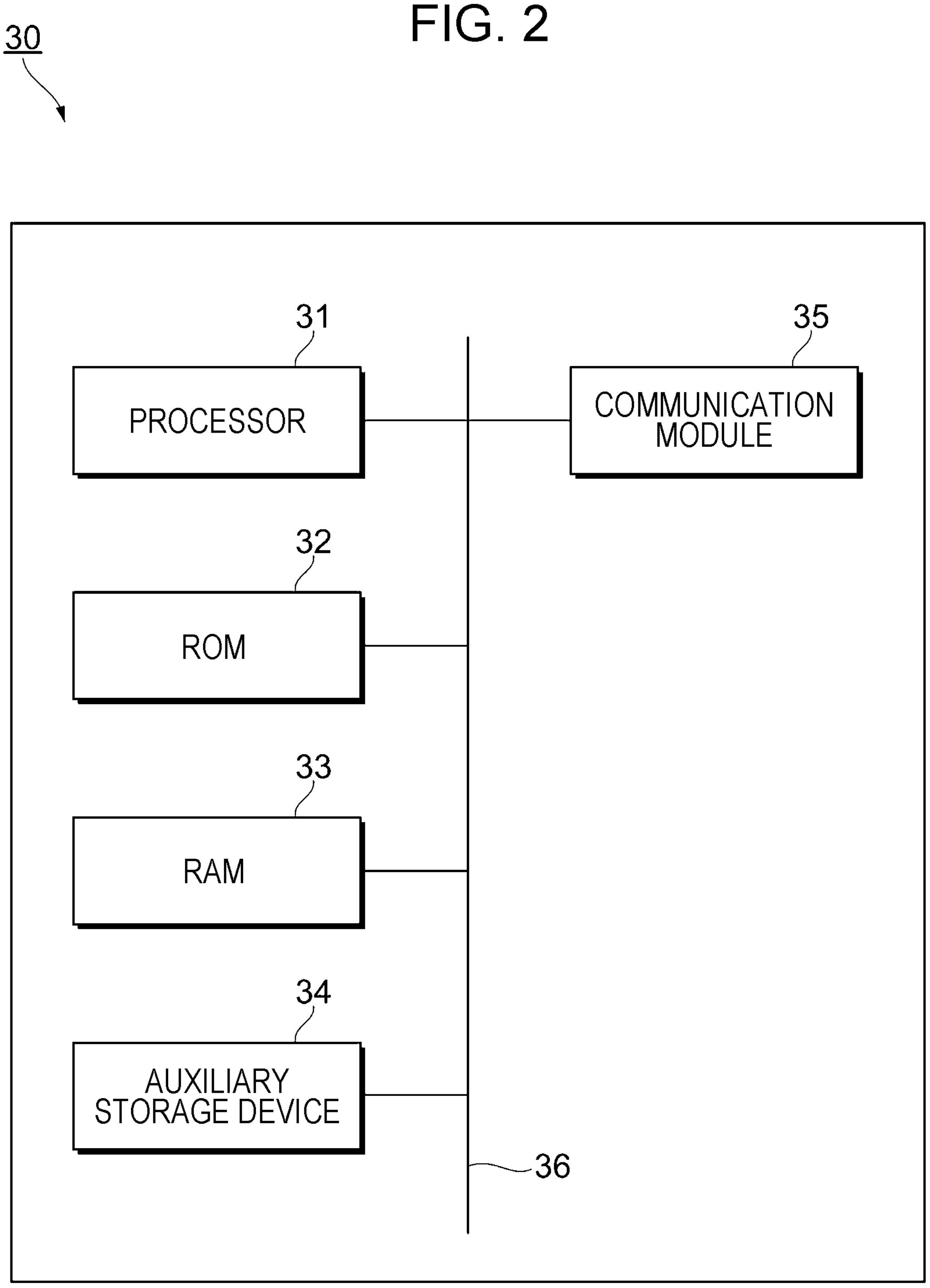
FIG. 2 illustrates an example of the hardware configuration of a print server.

FIG. 2 illustrates an example of the hardware configuration of the client terminal 30.

The print server 30 illustrated in FIG. 2 includes a processor 31, a read only memory (ROM) 32 that stores a basic input output system (BIOS) etc., a random access memory (RAM) 33 that is used as a work area for the processor 31, an auxiliary storage device 34, and a communication module 35.

The devices are connected to each other through a signal line 36 such as a bus.

The processor 31, the ROM 32, and the RAM 33 function as a so-called computer.

The processor 31 implements various functions through execution of a program. For example, the processor 31 acquires information (hereinafter also referred to as "illumination information") about illumination from an environment image, and generates an image that reproduces how an article would look at an observation location. In the present exemplary embodiment, generating an image that reproduces how an article would look is referred to as "controlling expression of an image".

The auxiliary storage device 34 is constituted of a hard disk device or a semiconductor storage, for example. The auxiliary storage device 34 stores a program and various data. The term "program" is used herein as a generic name for an operating system (OS) and application programs. The application programs include a program that simulates the texture of an article.

While the auxiliary storage device 34 is built in the print server 30 in FIG. 2, the auxiliary storage device 34 may be mounted externally to the print server 30, or may be provided on the network N (see FIG. 1).

The communication module 35 is an interface that implements communication with the client terminal 10 (see FIG. 1) and the image forming apparatus 20 through the network N. A module that conforms to any communication standard such as Ethernet (registered trademark) or Wi-Fi (registered trademark) may be used as the communication module 35.

<Hardware Configuration of Client Terminal>

Figure 3:
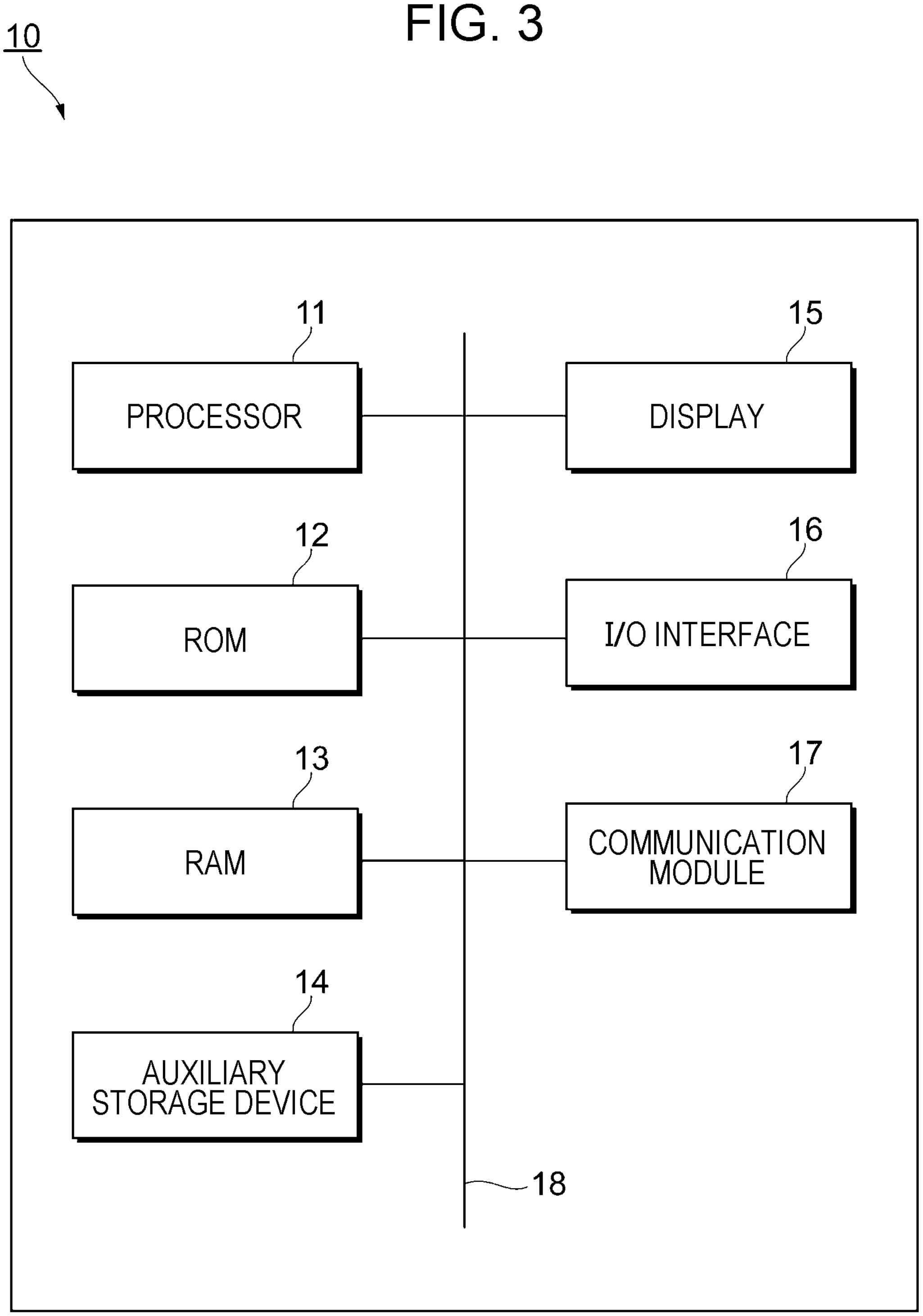
FIG. 3 illustrates an example of the hardware configuration of a client terminal.

FIG. 3 illustrates an example of the hardware configuration of the client terminal 10.

The client terminal 10 illustrated in FIG. 3 includes a processor 11 that controls operation of the entire apparatus, a ROM 12 that stores a BIOS etc., a RAM 13 that is used as a work area for the processor 11, an auxiliary storage device 14, a display 15, an input/output (I/O) interface 16, and a communication module 17. The processor 11 and the other devices are connected to each other through a signal line 18 such as a bus.

The processor 11, the ROM 12, and the RAM 13 function as a so-called computer. The processor 11 implements various functions through execution of a program. For example, the processor 11 executes uploading of an environment image, uploading of information on an article to be observed at an observation location, and display of an image that reproduces how the article would look.

The auxiliary storage device 14 may be a hard disk device or a semiconductor storage, for example. The auxiliary storage device 14 stores not only a program such as an OS but also an environment image, an image of an article to be processed, etc.

The display 15 may be a liquid crystal display or an organic electro-luminescence (EL) display, for example. An image that reproduces how an article would look at an observation location is displayed on the display 15.

The I/O interface 16 is a device that receives an input from the user made using a keyboard or a mouse, for example. Specifically, the I/O interface 16 receives an input such as positioning or movement of a mouse cursor, clicking, etc. The I/O interface 16 is also a device that outputs data to an external terminal. The external terminal includes not only the image forming apparatus 20 etc. connected through the network N but also a terminal connected by way of the Internet.

The communication module 17 is a device that enables communication with the print server 30 etc. connected to the network N. A module that conforms to any communication standard such as Ethernet (registered trademark) or Wi-Fi (registered trademark) may be used as the communication module 17.

<Overview of Texture Reproduction Process>

A texture reproduction process executed by the print server 30 (see FIG. 1) will be described below.

The texture reproduction process according to the present exemplary embodiment is started when information on an article and an environment image are given from the client terminal 10 (see FIG. 1) to the print server 30.

Figure 4:
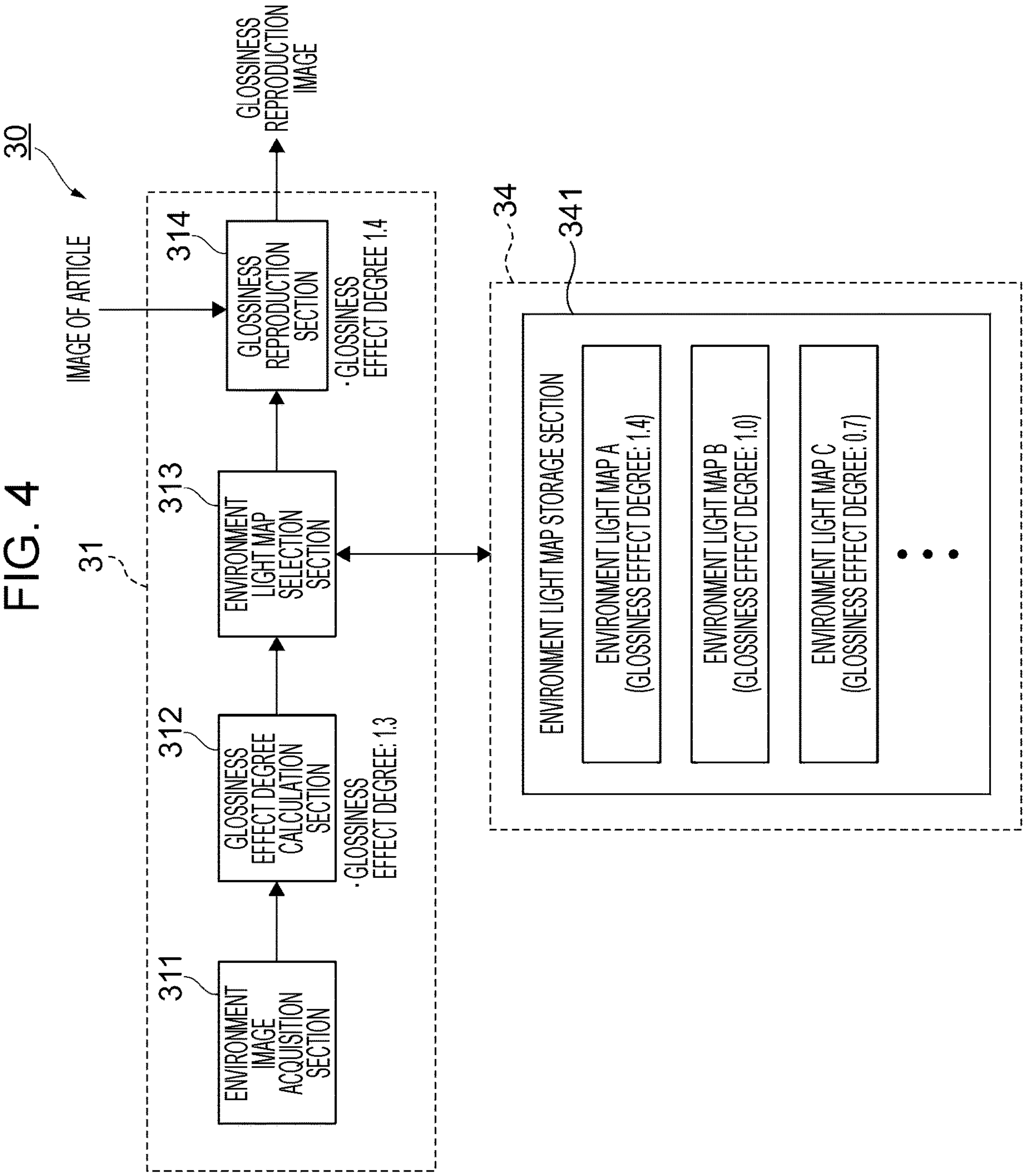
FIG. 4 illustrates an example of the functional configuration of the print server assumed in the first exemplary embodiment.

FIG. 4 illustrates an example of the functional configuration of the print server 30 assumed in the first exemplary embodiment. In FIG. 4, portions corresponding to those in FIG. 2 are denoted by corresponding reference signs.

Through execution of a program, the processor 31 functions as an environment image acquisition section 311, a glossiness effect degree calculation section 312, an environmental light map selection section 313, and a glossiness reproduction section 314.

The environment image acquisition section 311 is a functional section that acquires an environment image. The environment image acquisition section 311 acquires an environment image uploaded from the client terminal 10, for example. The environment image acquisition section 311 may acquire an environment image from the auxiliary storage device 34 (see FIG. 2). In this case, the client terminal 10 specifies an image to be used as the environment image. The environment image is an example of a "first image captured at an observation location".

The glossiness effect degree calculation section 312 is a functional section that calculates a glossiness effect degree from an environment image. The glossiness effect degree is an index that indicates an effect of illumination on a glossiness, and indicates that the glossiness is felt better as the value of the index is larger. The glossiness effect degree is an example of illumination information at an observation location.

In the present exemplary embodiment, the glossiness effect degree is calculated as a standard deviation of the brightness of environment images.

When the standard deviation is small, for example, it is indicated that variations in the brightness among the environment images are small. In this case, illumination light at the observation location illuminates the surface of the article uniformly from various directions. Therefore, a small glossiness is felt on the surface of the article. Examples of this type of illumination include illumination with a diffusion plate.

When the standard deviation is medium, for example, it is indicated that variations in the brightness among the environment images are medium. In this case, illumination light at the observation location illuminates the surface of the article as a surface light source. Therefore, a medium glossiness is felt on the surface of the article. Examples of this type of illumination include organic electro-luminescence (EL) illumination.

When the standard deviation is large, for example, it is indicated that variations in the brightness among the environment images are large. In this case, illumination light at the observation location illuminates the surface of the article from a specific direction as a point light source. Therefore, a large glossiness is felt on the surface of the article. Examples of this type of illumination include light emitting diode (LED) illumination.

The standard deviation is an example of a “feature amount related to brightness distribution”.

The environment light map selection section 313 is a functional section that selects an environment light map with a glossiness effect degree that is similar to that of the environment image, from among environment light maps A, B, C, . . . stored in an environment light map storage section 341.

In the present exemplary embodiment, the environment light map storage section 341 stores one environment light map for each glossiness effect degree. The environment light maps A, B, C, . . . as used herein are an example of a “plurality of environment light maps prepared in advance”.

While the environment light map A with a glossiness effect degree of 1.4, the environment light map B with a glossiness effect degree of 1.0, and the environment light map C with a glossiness effect degree of 0.7 are illustrated in FIG. 4, the environment light map storage section 341 may store environment light maps with different values of the glossiness effect degree.

For example, the values of the glossiness effect degree may be 1.3, 1.2, 1.1, 1.0, 0.9, 0.8, etc. with the interval between such values being 0.1, or the interval may be 0.2 or 0.5. Different intervals may be used in a mixed manner.

The glossiness effect degree may have values more than 1.4 such as 1.5 and 1.6, or may have values less than 0.7 such as 0.6 and 0.5, for example.

In the present exemplary embodiment, omnidirectional images are assumed as the environment light maps, for example. The environment light maps may be upper hemisphere images.

The glossiness reproduction section 314 is a functional section that generates an image (hereinafter referred to as a “glossiness reproduction image”) that reproduces how an article would look in terms of glossiness etc. at an observation location using an environment light map that is close to illumination information at the observation location.

The information on an article as a target of reproduction as to how it would look is uploaded from the client terminal 10 (see FIG. 1).

The glossiness reproduction section 314 according to the present exemplary embodiment generates a glossiness reproduction image using image-based lighting. A glossiness reproduction image that reflects how an article would look when observed at an observation location from various viewing directions is generated through the image-based lighting. The glossiness reproduction image is an example of a “second image corresponding to an article observed at an observation location”.

<Details of Texture Reproduction Process>

Process operation executed by the various functional sections will be described in detail below.

<Environment Image Acquisition Section>

The environment image acquired by the environment image acquisition section 311 may be a single image captured at an observation location. That is, it is not necessary that a plurality of environment images should be provided for each observation location. Since image capture is performed once, a single color temperature, a single exposure condition, etc. are used. That is, any camera may be used to capture an environment image. For example, a camera of a smartphone or a camera capable of capturing an omnidirectional image may be used.

In the present exemplary embodiment, a High Dynamic Range (HDR) format or an OpenEXR format, for example, is assumed as an image format of the environment image. The HDR format and the OpenEXR format are known as file formats with a high dynamic range.

The OpenEXR format supports a higher tone resolution than the HDR format. That is, the OpenEXR format enables finer tone expression than the HDR format.

In the HDR format, RGB values and an exponent are each expressed in 8 bits (i.e. a total of 32 bits) per pixel.

In the OpenEXR format, RGB values are each expressed in 16 bits, a sign is expressed in 1 bit, an exponent is expressed in 5 bits, and a mantissa is expressed in 10 bits per pixel. In other versions, RGB values are each expressed in 32 bits or each expressed in 24 bits.

<Glossiness Effect Degree Calculation Section>

Figure 5:
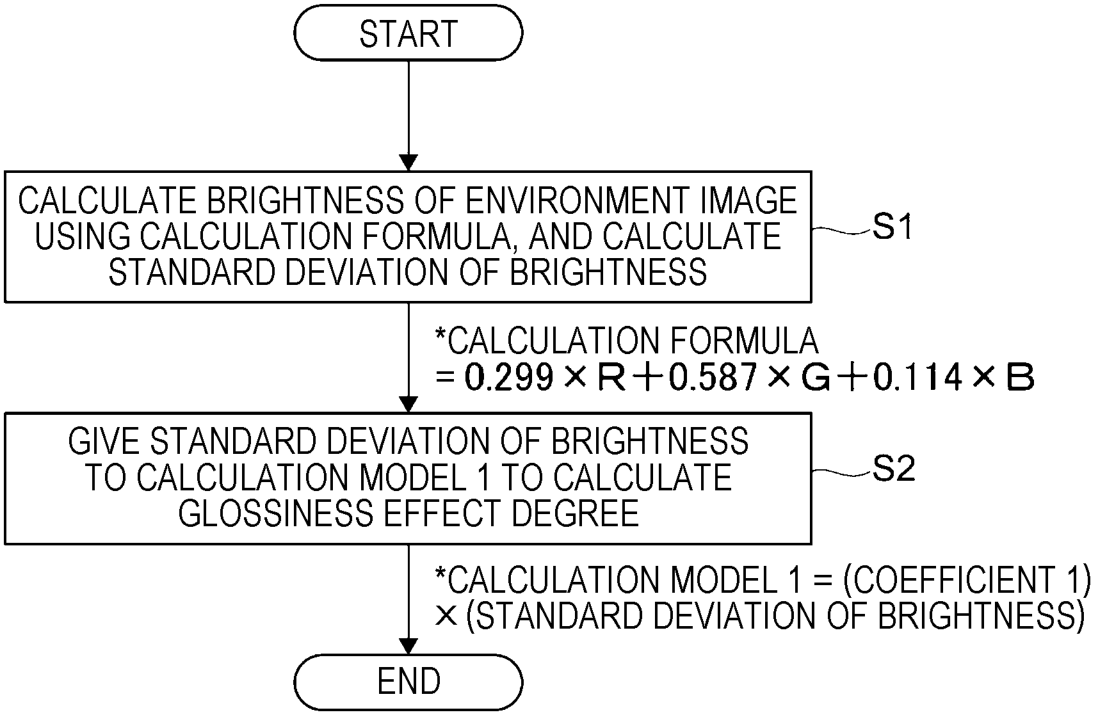
FIG. 5 is a flowchart illustrating an example of process operation executed by a glossiness effect degree calculation section that is used in the first exemplary embodiment.

FIG. 5 is a flowchart illustrating an example of process operation executed by the glossiness effect degree calculation section 312 that is used in the first exemplary embodiment. The symbol S in the drawing indicates a step.

First, the glossiness effect degree calculation section 312 calculates a brightness of an environment image using a calculation formula, and calculates a standard deviation of the brightness (step 1). The calculation formula may be $0.299\times R+0.587\times G+0.114\times B$, for example.

The brightness is calculated for each pixel, and the standard deviation is calculated for the entire environment image. In the present exemplary embodiment, a calculated value of the standard deviation is rounded off to the second decimal place.

Next, the glossiness effect degree calculation section 312 gives the standard deviation of the brightness to a calculation model 1 to calculate a glossiness effect degree (step 2). The calculation model 1 may be (coefficient 1)×(standard deviation of brightness), for example. The coefficient 1 is a coefficient that is used to calculate a glossiness effect degree using the standard deviation of the brightness. In the present exemplary embodiment, a calculated value of the glossiness effect degree is rounded off to the first decimal place. The glossiness effect degree is an example of an “index that represents a gloss degree”.

The glossiness effect degree may be calculated using a distortion degree. The distortion degree is an example of a “feature amount related to brightness distribution”.

Figure 6:
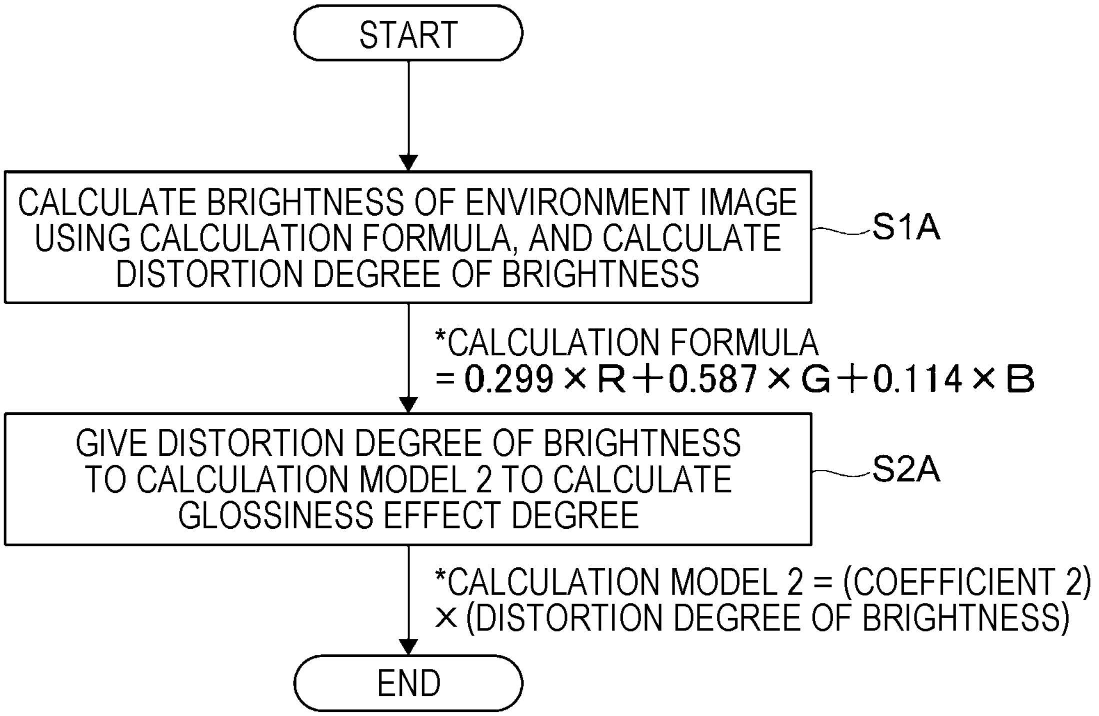
FIG. 6 is a flowchart illustrating another example of process operation executed by the glossiness effect degree calculation section that is used in the first exemplary embodiment.

FIG. 6 is a flowchart illustrating another example of process operation executed by the glossiness effect degree calculation section 312 that is used in the first exemplary embodiment.

First, the glossiness effect degree calculation section 312 calculates a brightness of an environment image using a calculation formula, and calculates a distortion degree of the brightness (step 1A). The calculation formula may be $0.299\times R+0.587\times G+0.114\times B$, for example.

The brightness is calculated for each pixel, and the distortion degree of the brightness is calculated for the entire environment image. The distortion degree indicates the distortion degree of the distribution of the brightness calculated for the entire environment image with respect to a normal distribution. In other words, the distortion degree of the brightness is an index that indicates the bilateral symmetry of the distribution.

Next, the glossiness effect degree calculation section 312 gives the distortion degree of the brightness to a calculation model 2 to calculate a glossiness effect degree (step 2A). The calculation model 2 may be (coefficient 2)×(distortion degree of brightness), for example. The coefficient 2 is a coefficient that is used to calculate a glossiness effect degree using the distortion degree of the brightness. Also in this case, a calculated value of the glossiness effect degree is rounded off to the first decimal place.

<Environment Light Map Selection Section>

The environment light map selection section 313 is a functional section that selects an environment light map with a value that is close to the glossiness effect degree calculated by the glossiness effect degree calculation section 312. FIG. 4 illustrates a case where the environment image has a glossiness effect degree of 1.3.

Figure 7:
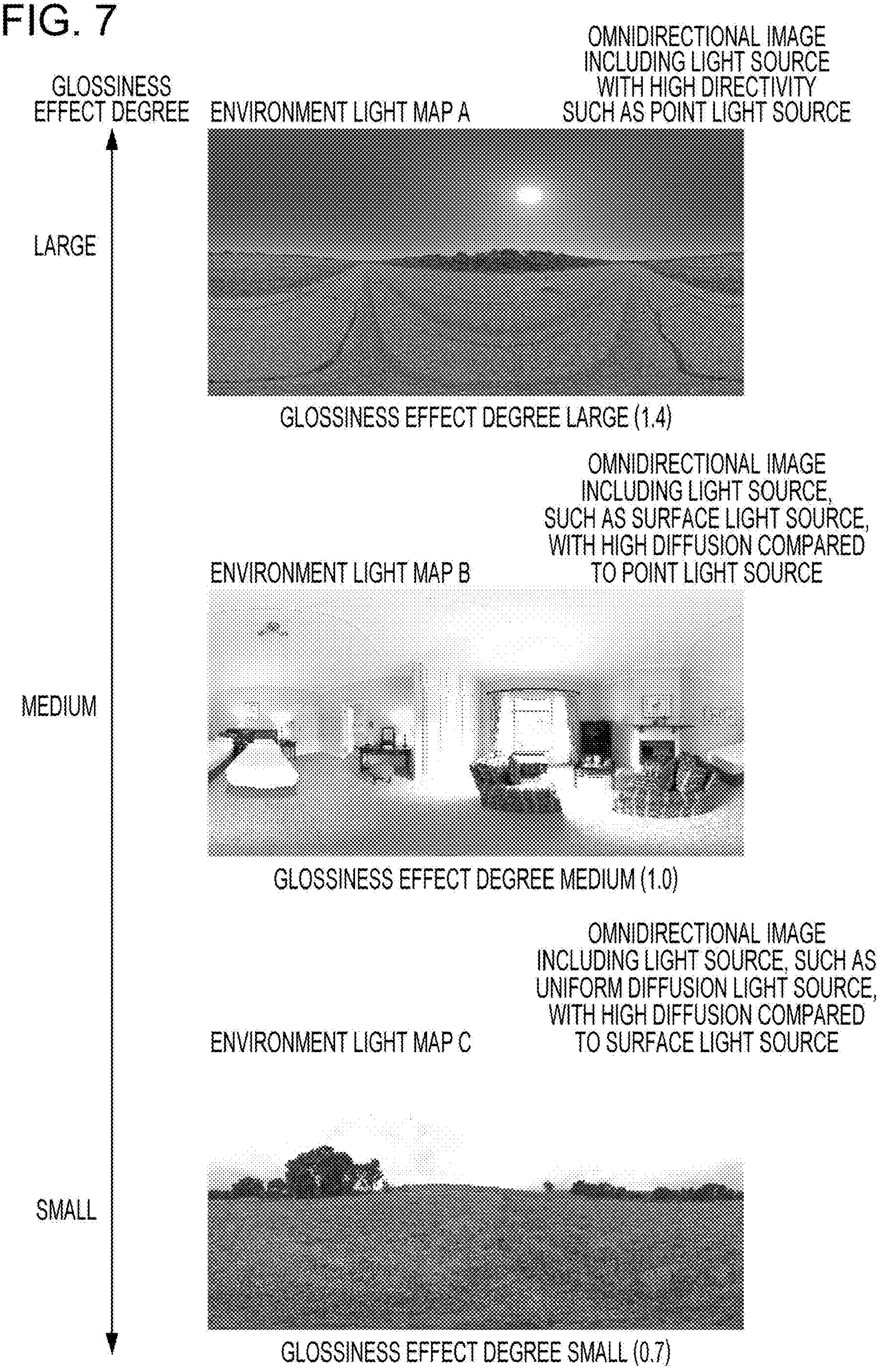
FIG. 7 illustrates image examples of environment light maps stored in an environment light map storage section.

FIG. 7 illustrates image examples of the environment light maps A, B, and C stored in the environment light map storage section 341 (see FIG. 4).

The vertical axis in FIG. 7 indicates the glossiness effect degree. In FIG. 7, the glossiness effect degree becomes larger toward the upper side, and becomes smaller toward the lower side.

In FIG. 7, the environment light maps are illustrated as omnidirectional panoramic images in which an omnidirectional image is projected onto a two-dimensional plane using equidistant cylindrical projection.

The environment light map A is an omnidirectional image that includes a light source with high directivity such as a point light source. Examples of the point light source include LED illumination, for example. The glossiness effect degree of the environment light map A illustrated in FIG. 7 is 1.4. The value of the glossiness effect degree is exemplary, and it is not intended that the glossiness effect degree of the environment light map A is limited to 1.4.

The environment light map B is an omnidirectional image that includes a light source with high diffusion, such as a surface light source, compared to the point light source. Examples of the surface light source include organic EL illumination. In the present exemplary embodiment, the glossiness effect degree of the environment light map B is 1.0. The value here is also exemplary, and it is not intended that the glossiness effect degree of the environment light map B is limited to 1.0.

The environment light map C is an omnidirectional image that includes a light source with high diffusion, such as a uniform diffusion light source, compared to the surface light source. Examples of the uniform diffusion light source include illumination with a diffusion plate. In the present exemplary embodiment, the glossiness effect degree of the environment light map C is 0.7. The value here is also exemplary, and it is not intended that the glossiness effect degree of the environment light map C is limited to 0.7.

<Glossiness Reproduction Section>

Figure 8:
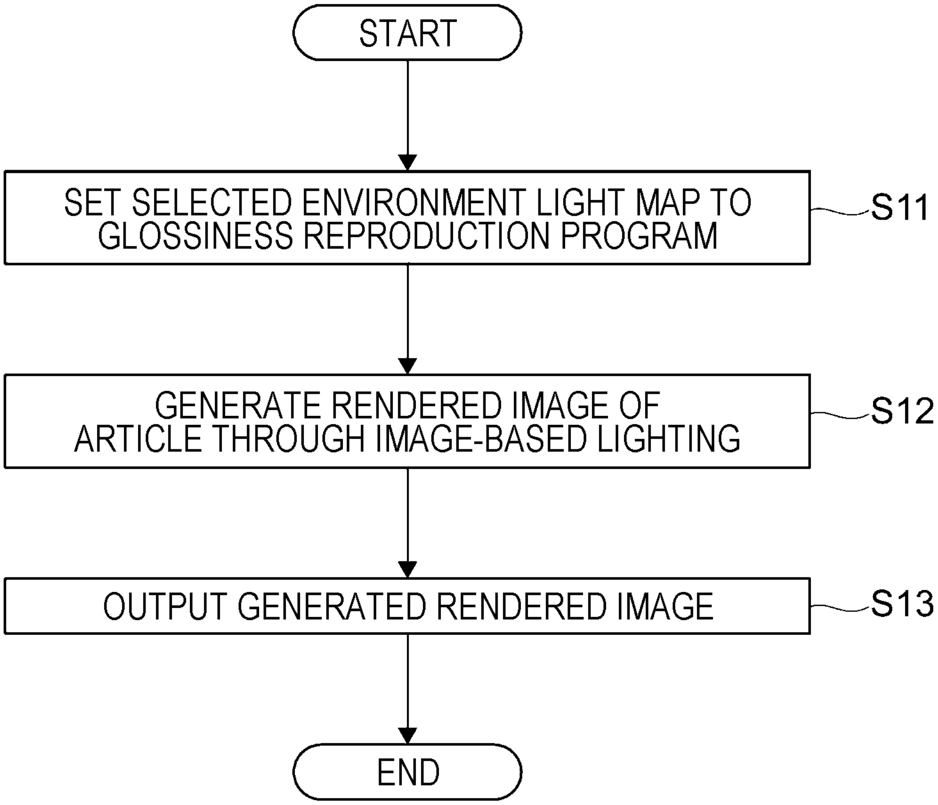
FIG. 8 is a flowchart illustrating an example of process operation executed by a glossiness reproduction section that is used in the first exemplary embodiment.

FIG. 8 is a flowchart illustrating an example of process operation executed by the glossiness reproduction section 314 that is used in the first exemplary embodiment.

First, the glossiness reproduction section 314 sets the selected environment light map to a glossiness reproduction program (step 11). In the present exemplary embodiment, the glossiness effect degree of the environment image is 1.3. Therefore, the environment light map A with a glossiness effect degree of 1.4 is set to the glossiness reproduction program (see FIG. 7).

Next, the glossiness reproduction section 314 generates a rendered image of an article through image-based lighting (step 12).

The image-based lighting is a rendering method to reproduce how an article given from the user would look in terms of color and gloss using the set environment light map as illumination information and using the camera position as the point of view.

After that, the glossiness reproduction section 314 outputs the generated rendered image (i.e. glossiness reproduction image) (step 13). Natural light and shade that are close to those would be obtained when the article were observed at the observation location are expressed in the rendered image.

Figure 9:
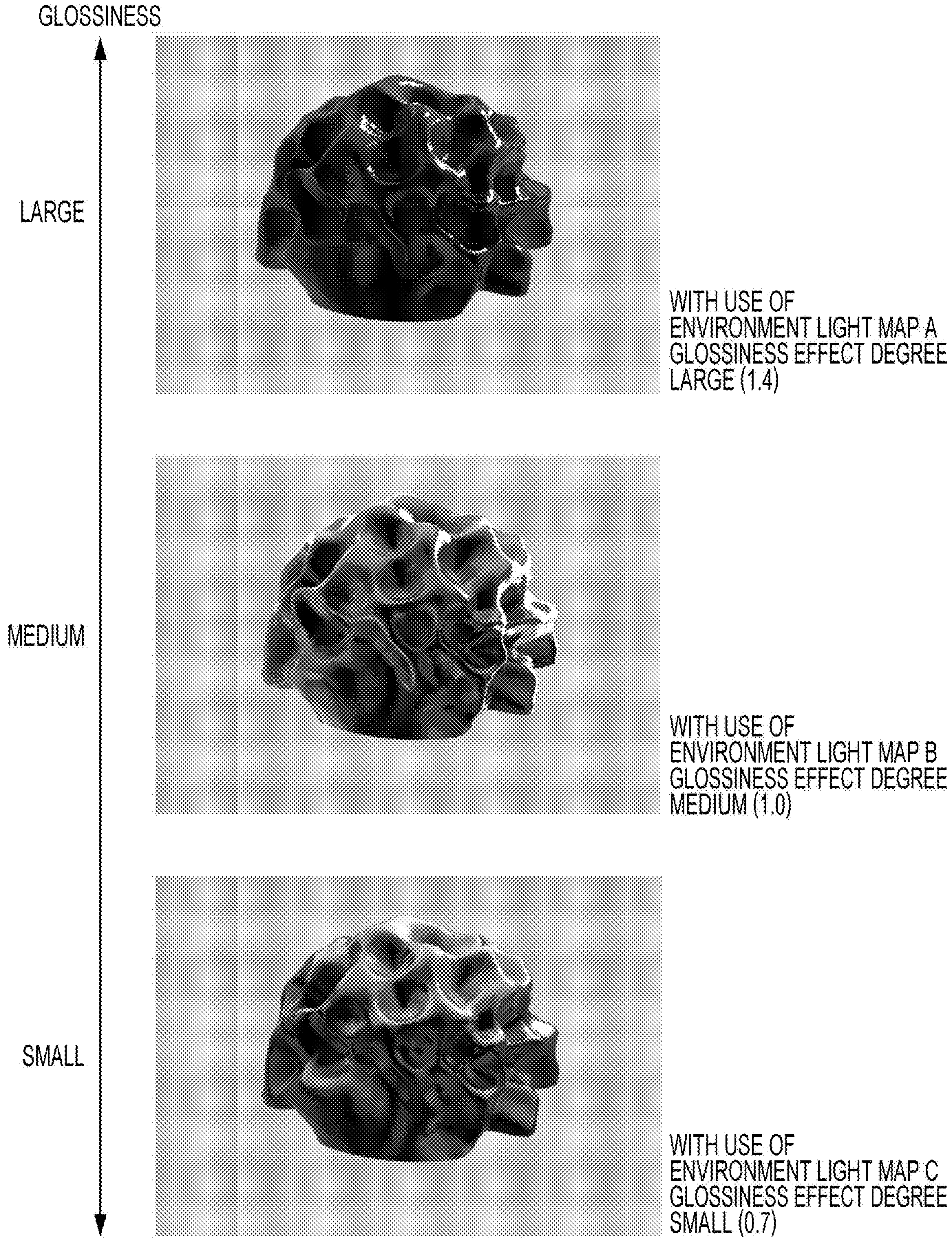
FIG. 9 illustrates examples of glossiness reproduction images output from the glossiness reproduction section.

FIG. 9 illustrates examples of glossiness reproduction images output from the glossiness reproduction section 314.

The vertical axis in FIG. 9 indicates the glossiness. In FIG. 9, the glossiness becomes larger toward the upper side, and becomes smaller toward the lower side.

The article illustrated in FIG. 9 has a large number of recesses and projections on the surface. An article with low surface roughness is assumed. The surface roughness of an article as a computer graphics (CG) model is expressed by a value called "roughness". The roughness may be 0.01, for example. The roughness value of a smooth surface is small, and the roughness value of a coarse surface is large, for example.

It is seen from FIG. 9 that the glossiness of glossiness reproduction images is different when different environment light maps are set.

The generated glossiness reproduction image is displayed on the display 15 (see FIG. 3) of the client terminal 10 (see FIG. 1).

Figure 10:
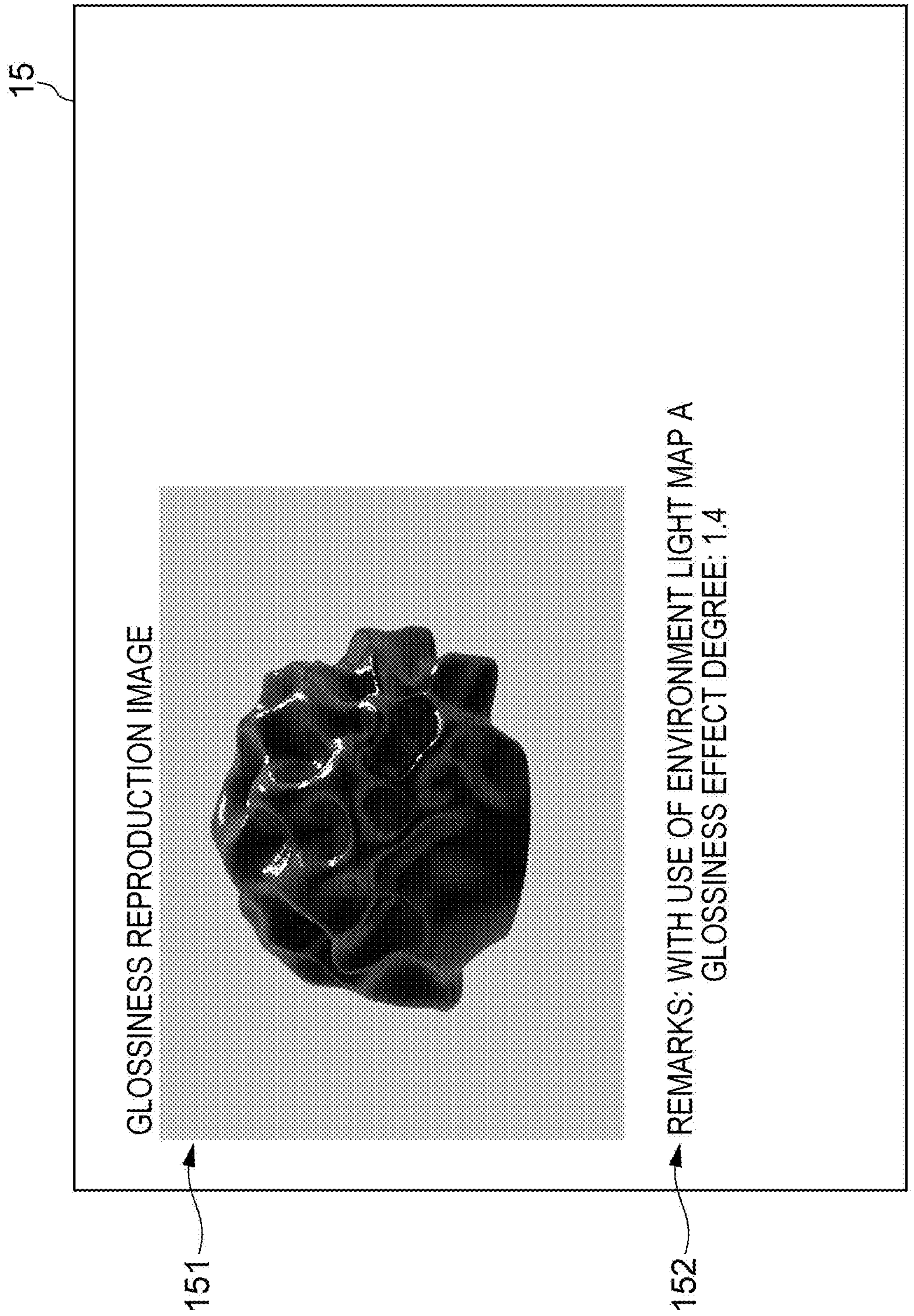
FIG. 10 illustrates a display example of the glossiness reproduction image on the client terminal.

FIG. 10 illustrates a display example of the glossiness reproduction image on the client terminal 10.

In FIG. 10, the display 15 displays a glossiness reproduction image 151 output from the glossiness reproduction section 314 (see FIG. 4) and a remarks field 152.

In FIG. 10, it is stated in the remarks field 152 that the environment light map A was used and that the glossiness effect degree is 1.4. This information display enables the user to confirm not only the generated glossiness reproduction image 151 but also information on the environment light map that was used to generate the glossiness reproduction image 151. As a result, the user is enabled to verify the choice of the environment light map.

The display screen illustrated in FIG. 10 may additionally display information on the environment image and the glossiness effect degree of the environment image.

Besides, in displaying a glossiness reproduction image, the glossiness reproduction section 314 may display an environment light map that was used to generate the glossiness reproduction image on the display 15 of the client terminal 10.

Figure 11:
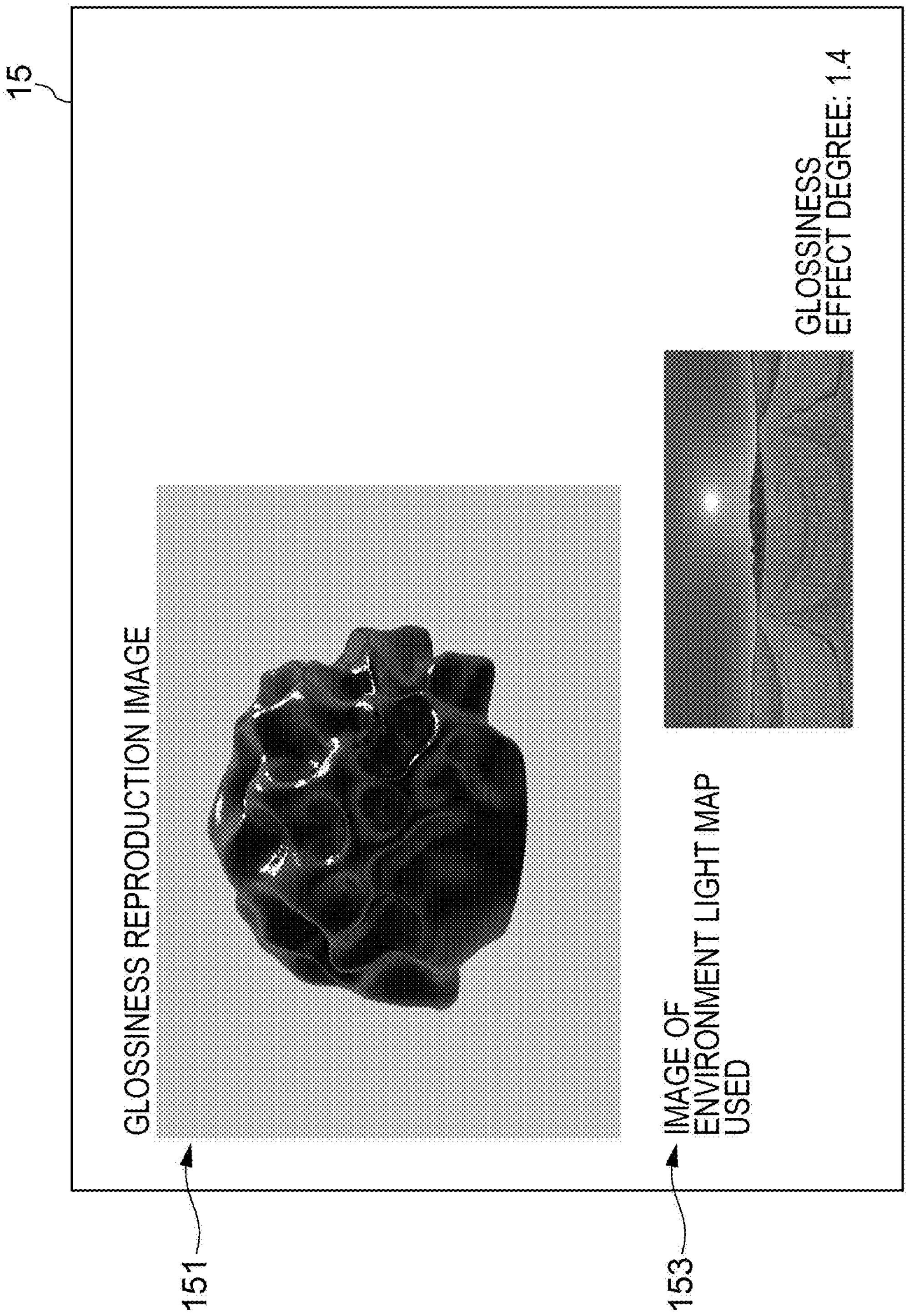
FIG. 11 illustrates another display example of the glossiness reproduction image on the client terminal.

FIG. 11 illustrates another display example of the glossiness reproduction image on the client terminal 10. In FIG. 11, portions corresponding to those in FIG. 10 are denoted by corresponding reference signs.

In FIG. 11, the display 15 displays a glossiness reproduction image 151 output from the glossiness reproduction section 314 (see FIG. 4) and an environment light map image 153 that was used to generate the glossiness reproduction image 151.

In FIG. 11, it is indicated that the glossiness effect degree is 1.4, in addition to the environment light map image 153.

This information display enables the user to confirm not only the generated glossiness reproduction image 151 but also the environment light map that was used to generate the glossiness reproduction image 151. As a result, the user is enabled to verify the choice of the environment light map.

Figure 12:
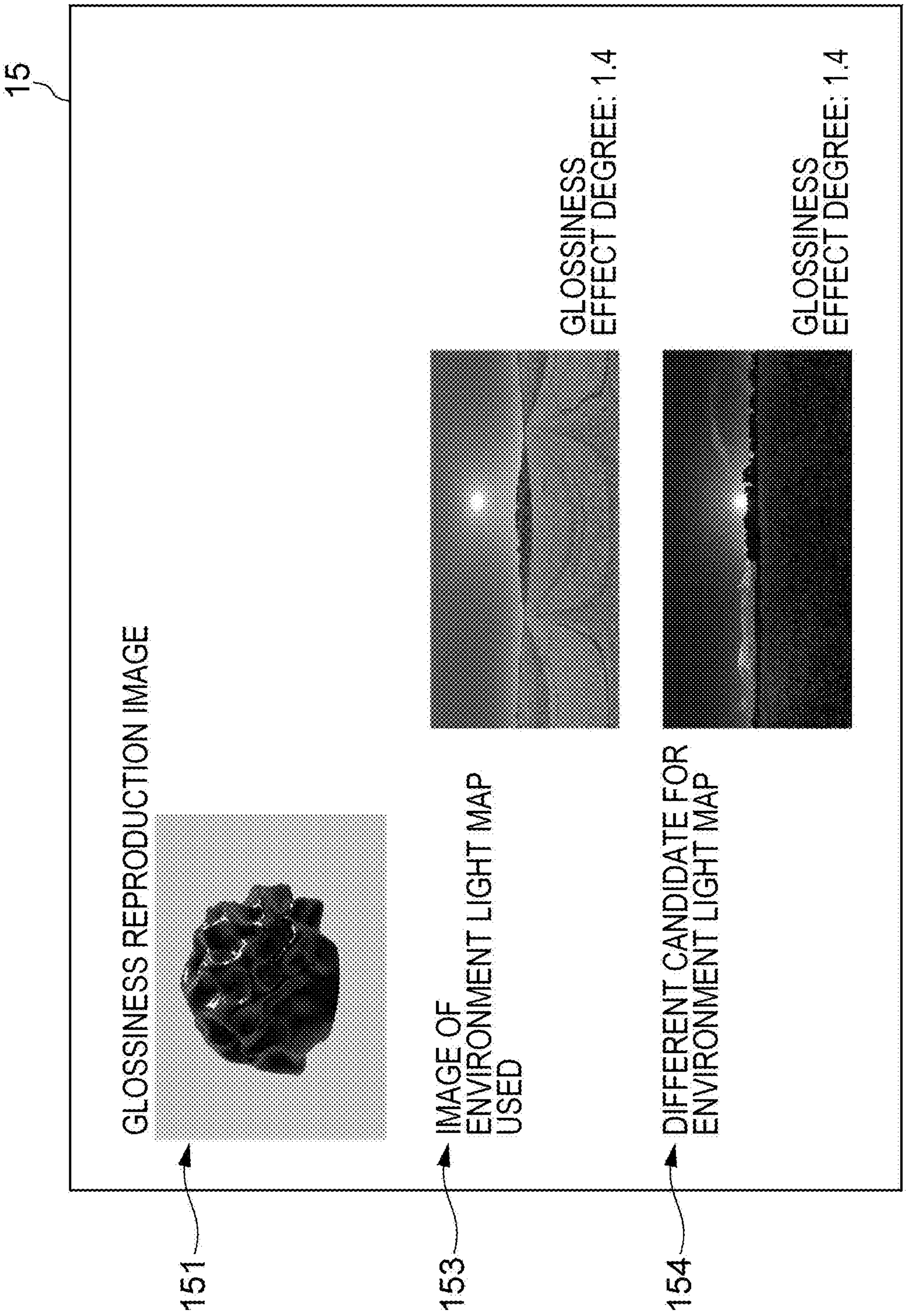
FIG. 12 illustrates another display example of the glossiness reproduction image on the client terminal.

FIG. 12 illustrates another display example of the glossiness reproduction image on the client terminal 10. In FIG. 12, portions corresponding to those in FIG. 11 are denoted by corresponding reference signs.

In FIG. 12, the display 15 displays a glossiness reproduction image 151 output from the glossiness reproduction section 314 (see FIG. 4), an environment light map image 153 that was used to generate the glossiness reproduction image 151, and a different candidate 154 for an environment light map. That is, this screen example illustrates an example in which a plurality of environment light map images with glossiness effect degrees close to the glossiness effect degree calculated for the environment image are displayed in association with the glossiness reproduction image 151.

The display illustrated in FIG. 12 is based on the assumption that the environment light map storage section 341 (see FIG. 4) stores a plurality of environment light maps for each glossiness effect degree.

In FIG. 12, it is indicated that the glossiness effect degree of the different candidate 154 for an environment light map is 1.4.

Not only an image of the environment light map that was used to generate the glossiness reproduction image 151 but also an image of the different candidate 154 for an environment light map is displayed, which enables the user to provide an instruction to regenerate a glossiness reproduction image 151 using the different candidate 154.

Providing the function of displaying the different candidate 154 not only enables the user to verity the environment light map that was used to generate the glossiness reproduction image 151, but also enables the user to confirm the glossiness reproduction image 151 generated using the different candidate 154 on the display 15.

The screen examples illustrated in FIGS. 10 to 12 may also be adopted for other exemplary embodiments to be discussed later.

Second Exemplary Embodiment

A method of enhancing the degree of reproducibility of the glossiness of an article will be described in accordance with the present exemplary embodiment.

Also in the present exemplary embodiment, the print system 1 illustrated in FIG. 1 is assumed.

<Overview of Texture Reproduction Process>

Figure 13:
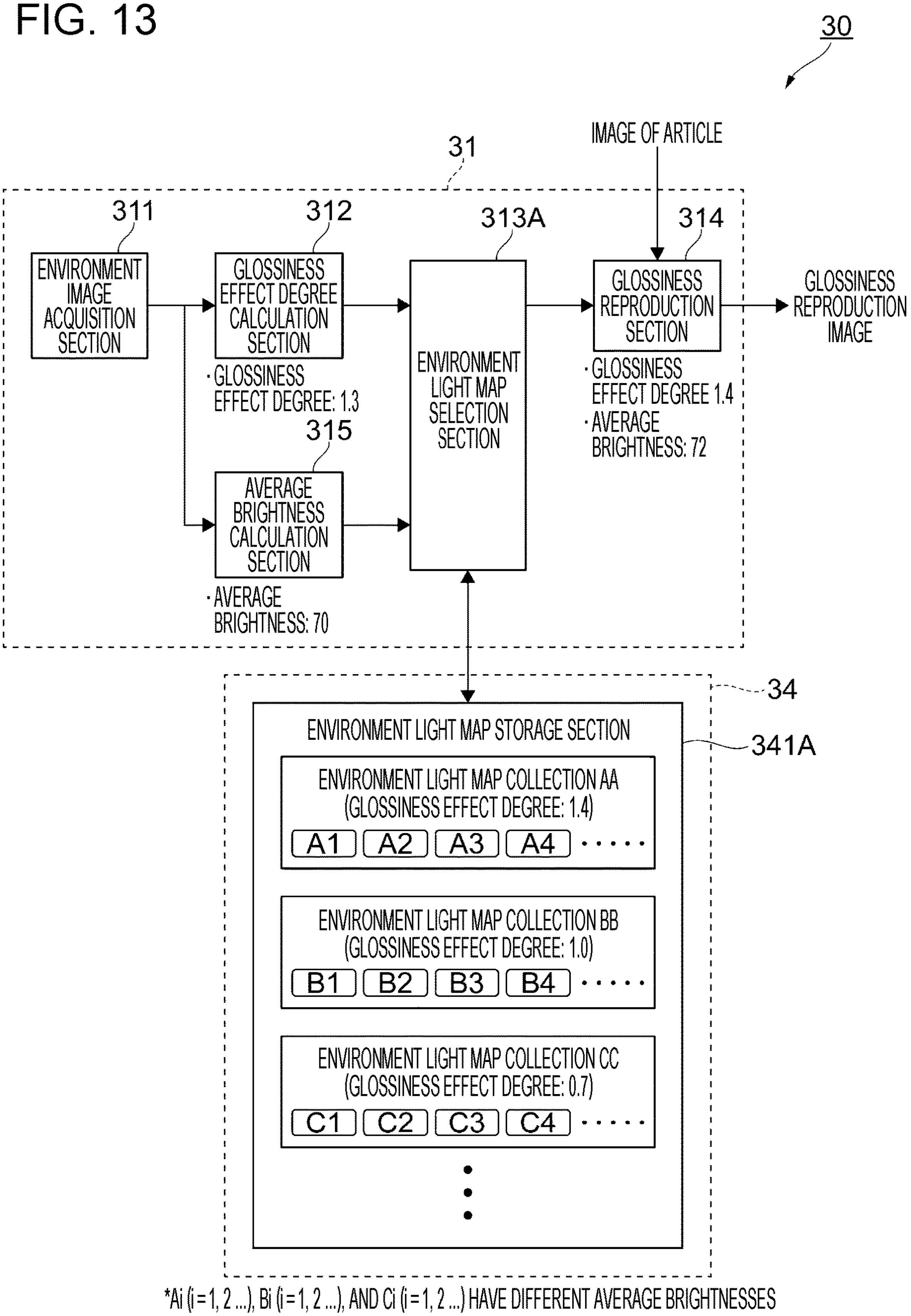
FIG. 13 illustrates an example of the functional configuration of a print server assumed in a second exemplary embodiment.

FIG. 13 illustrates an example of the functional configuration of a print server 30 assumed in a second exemplary embodiment. In FIG. 13, portions corresponding to those in FIG. 4 are denoted by corresponding reference signs.

One of features that are peculiar to the print server 30 illustrated in FIG. 13 is an average brightness calculation section 315 that calculates an average brightness of an environment image. The calculated average brightness is output to an environment light map selection section 313A.

In this manner, a glossiness effect degree and an average brightness calculated for an environment image captured at an observation location are given to the environment light map selection section 313A that is used in the present exemplary embodiment. That is, the environment light map selection section 313A selects an environment light map that is close to the environment at the observation location from an environment light map storage section 341A using the glossiness effect degree and the average brightness.

In the present exemplary embodiment, the environment light map storage section 341A is required to store a plurality of environment light maps with different average brightnesses for each glossiness effect degree.

In FIG. 13, collections of environment light maps with the same glossiness effect degree are indicated as environment light map collections.

For example, an environment light map collection AA is a collection of environment light maps A1, A2, A3, . . . all with a glossiness effect degree of 1.4. The environment light maps A1, A2, A3, . . . have different average brightnesses.

An environment light map collection BB is a collection of environment light maps B1, B2, B3, . . . all with a glossiness effect degree of 1.0. The environment light maps B1, B2, B3, . . . have different average brightnesses.

Similarly, an environment light map collection CC is a collection of environment light maps C1, C2, C3, . . . all with a glossiness effect degree of 0.7. The environment light maps C1, C2, C3, . . . have different average brightnesses.

The environment light map selection section 313A discussed earlier selects an environment light map with a glossiness effect degree and an average brightness close to those of the environment image, and outputs the selected environment light map to the glossiness reproduction section 314.

<Details of Texture Reproduction Process>

Differences from the first exemplary embodiment will be described below.

<Average Brightness Calculation Section>

Figure 14:
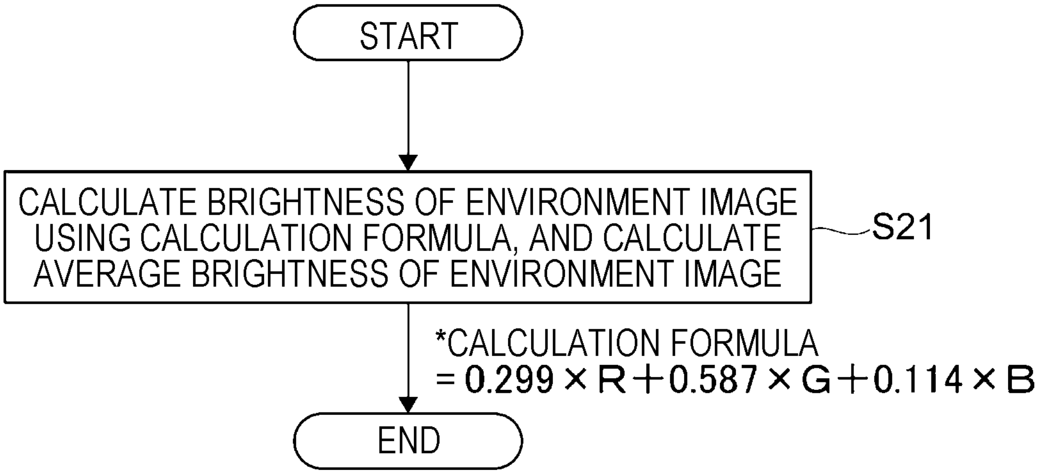
FIG. 14 is a flowchart illustrating an example of process operation executed by an average brightness calculation section that is used in the second exemplary embodiment.

FIG. 14 is a flowchart illustrating an example of process operation executed by the average brightness calculation section 315 that is used in the second exemplary embodiment.

The average brightness calculation section 315 calculates a brightness of an environment image using a calculation formula, and calculates an average brightness of the environment image (step 21). The calculation formula may be $0.299\times R+0.587\times G+0.114\times B$, for example.

The glossiness effect degree calculation section 312 also requires the brightness of each pixel. Thus, the glossiness effect degree calculation section 312 and the average brightness calculation section 315 may share the brightness calculated for each pixel of the environment image.

The average brightness is calculated for the entire environment image. In the present exemplary embodiment, a calculated value of the average brightness is rounded off to the second decimal place.

<Environment Light Map Selection Section>

The environment light map selection section 313A selects an environment light map with values close to the glossiness effect degree calculated by the glossiness effect degree calculation section 312 and the average brightness calculated by the average brightness calculation section 315. FIG. 13 illustrates a case where the environment image has a glossiness effect degree of 1.3 and an average brightness of 70.

Figure 15:
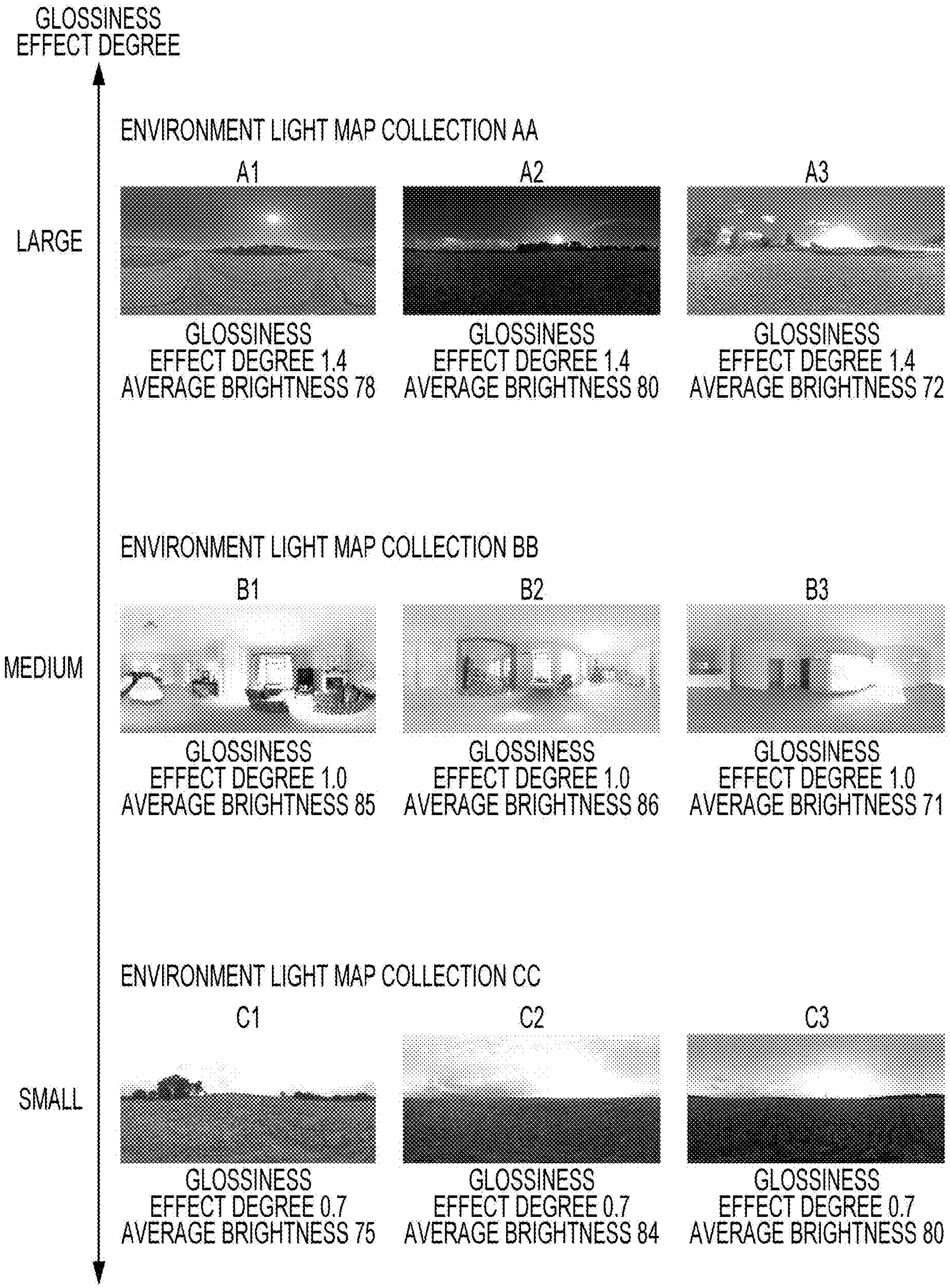
FIG. 15 illustrates image examples of environment light map collections stored in an environment light map storage section.

FIG. 15 illustrates image examples of environment light map collections AA, BB, and CC stored in the environment light map storage section 341A (see FIG. 13).

The vertical axis in FIG. 15 also indicates the glossiness effect degree. In FIG. 15, the glossiness effect degree becomes larger toward the upper side, and becomes smaller toward the lower side.

Also in FIG. 15, the environment light maps are illustrated as omnidirectional panoramic images in which an omnidirectional image is projected onto a two-dimensional plane using equidistant cylindrical projection.

Due to space limitations, only three environment light maps that belong to each environment light map collection are illustrated.

The environment light map collection AA includes omnidirectional images that include a point light source such as LED illumination. The environment light map A1 has a glossiness effect degree of 1.4 and an average brightness of 78. The environment light map A2 has a glossiness effect degree of 1.4 and an average brightness of 80. The environment light map A3 has a glossiness effect degree of 1.4 and an average brightness of 72.

The environment light map collection BB includes omnidirectional images that include a surface light source such as organic EL illumination. The environment light map B1 has a glossiness effect degree of 1.0 and an average brightness of 85. The environment light map B2 has a glossiness effect degree of 1.0 and an average brightness of 86. The environment light map B3 has a glossiness effect degree of 1.0 and an average brightness of 71.

The environment light map collection CC includes omnidirectional images that include uniform diffusion light source such as illumination with a diffusion plate. The environment light map C1 has a glossiness effect degree of 0.7 and an average brightness of 75. The environment light map C2 has a glossiness effect degree of 0.7 and an average brightness of 84. The environment light map C3 has a glossiness effect degree of 0.7 and an average brightness of 80.

The environment light map selection section 313A according to the present exemplary embodiment selects an environment light map with not only a glossiness effect degree but also an average brightness that is close to that of the environment image, and outputs the selected environment light map to the glossiness reproduction section 314. In the example in FIG. 15, the environment light map A3 is output to the glossiness reproduction section 314.

Third Exemplary Embodiment

Another method of enhancing the degree of reproducibility of the glossiness of an article will be described in accordance with the present exemplary embodiment.

Also in the present exemplary embodiment, the print system 1 illustrated in FIG. 1 is assumed.

<Overview of Texture Reproduction Process>

Figure 16:
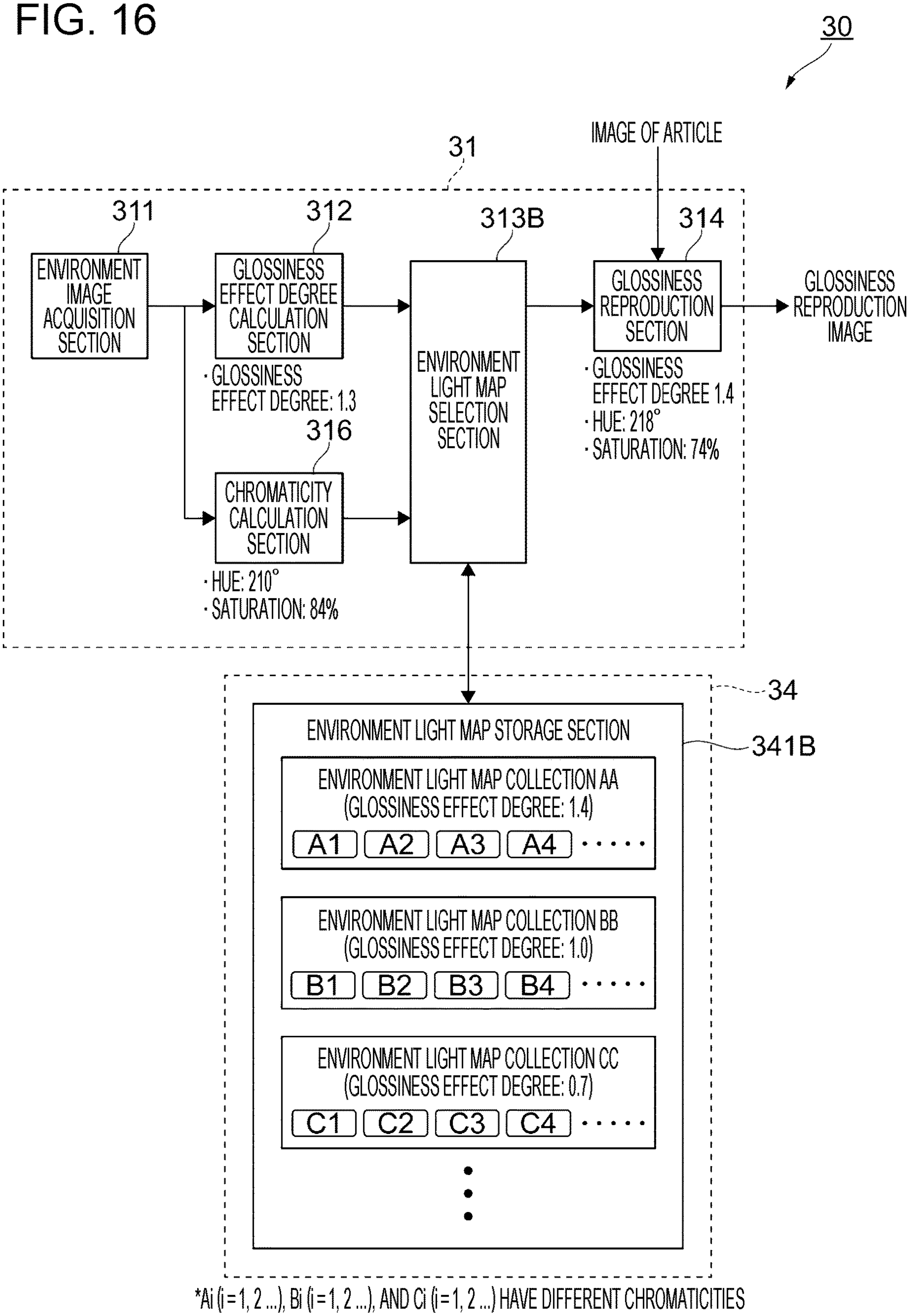
FIG. 16 illustrates an example of the functional configuration of a print server assumed in a third exemplary embodiment.

FIG. 16 illustrates an example of the functional configuration of a print server 30 assumed in a third exemplary embodiment. In FIG. 16, portions corresponding to those in FIG. 13 are denoted by corresponding reference signs.

One of features that are peculiar to the print server 30 illustrated in FIG. 16 is a chromaticity calculation section 316 that calculates a chromaticity of an environment image. The calculated chromaticity is output to the environment light map selection section 313B.

In this manner, a glossiness effect degree and a chromaticity calculated for an environment image captured at an observation location are given to the environment light map selection section 313B that is used in the present exemplary embodiment. That is, the environment light map selection section 313B selects an environment light map that is close to the environment at the observation location from an environment light map storage section 341B using the glossiness effect degree and the chromaticity. The chromaticity is given by hue and saturation.

In the present exemplary embodiment, the environment light map storage section 341B is required to store a plurality of environment light maps with different chromaticities for each glossiness effect degree.

Also in FIG. 16, collections of environment light maps with the same glossiness effect degree are indicated as environment light map collections.

For example, an environment light map collection AA is a collection of environment light maps A1, A2, A3, . . . all with a glossiness effect degree of 1.4. The environment light maps A1, A2, A3, . . . have different chromaticities.

An environment light map collection BB is a collection of environment light maps B1, B2, B3, . . . all with a glossiness effect degree of 1.0. The environment light maps B1, B2, B3, . . . have different chromaticities.

Similarly, an environment light map collection CC is a collection of environment light maps C1, C2, C3, . . . all with a glossiness effect degree of 0.7. The environment light maps C1, C2, C3, . . . have different chromaticities.

The environment light map selection section 313B discussed earlier selects an environment light map with a glossiness effect degree and a chromaticity close to those of the environment image, and outputs the selected environment light map to the glossiness reproduction section 314.

<Details of Texture Reproduction Process>

Differences from the first exemplary embodiment will be described below.

<Chromaticity Calculation Section>

FIG. 17 is a flowchart illustrating an example of process operation executed by the chromaticity calculation section 316 that is used in the third exemplary embodiment.

The chromaticity calculation section 316 converts an environment image into HSV values (step 31).

As discussed earlier, the environment image is given in RGB values. The equations for conversion from RGB values into HSV values are known. FIG. 17 indicates the equations for conversion. H denotes hue, S denotes saturation, and V denotes value.

The chromaticity is calculated for the entire environment image. In the present exemplary embodiment, a calculated value of the chromaticity is rounded off to the second decimal place.

<Environment Light Map Selection Section>

The environment light map selection section 313B selects an environment light map with values close to the glossiness effect degree calculated by the glossiness effect degree calculation section 312 and the chromaticity calculated by the chromaticity calculation section 316. FIG. 16 illustrates a case where the environment image has a glossiness effect degree of 1.3, a hue of 210°, and a saturation of 84%.

Figure 18:
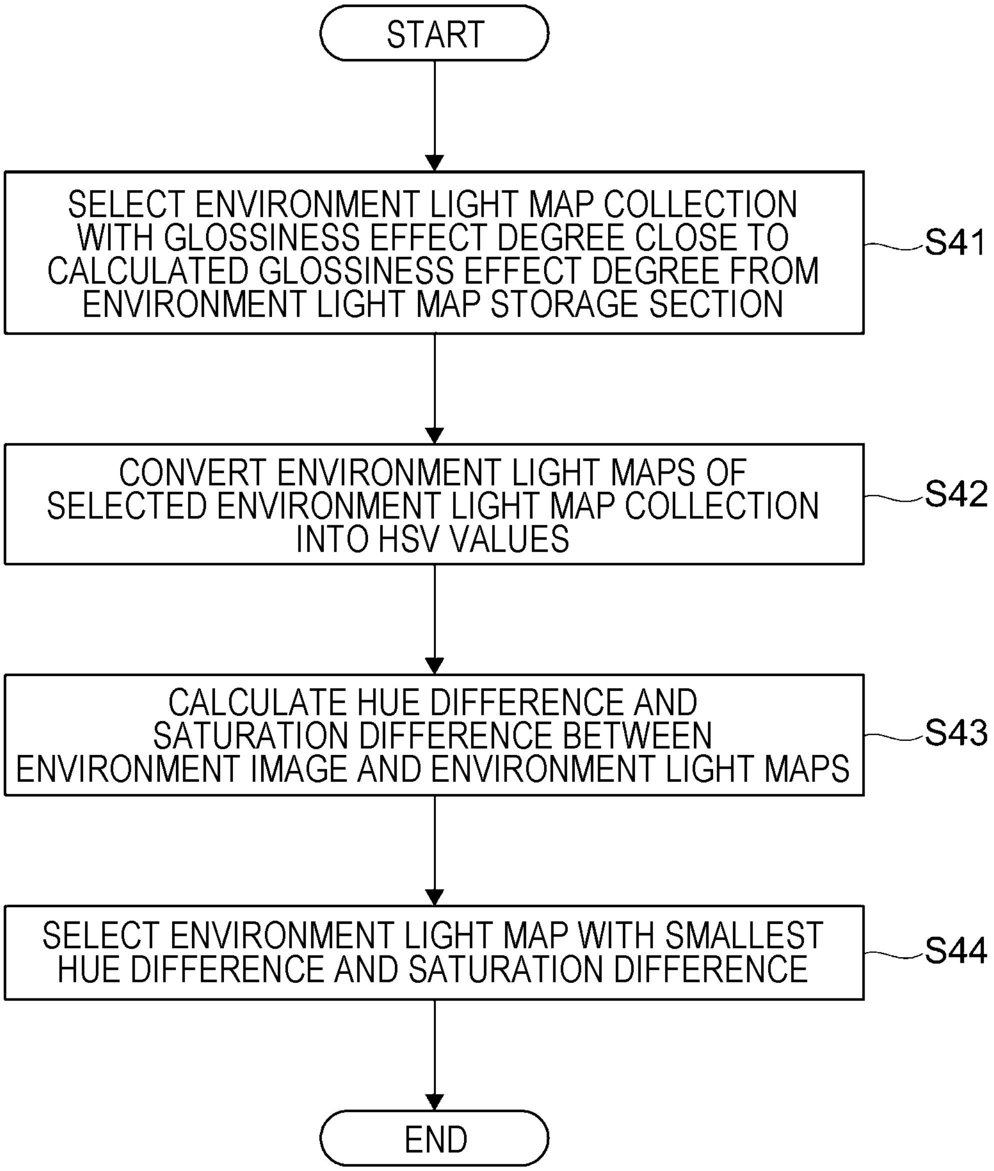
FIG. 18 is a flowchart illustrating another example of process operation executed by an environment light map selection section that is used in the third exemplary embodiment.

FIG. 18 is a flowchart illustrating another example of process operation executed by the environment light map selection section 313B that is used in the third exemplary embodiment.

First, the environment light map selection section 313B selects an environment light map collection with a glossiness effect degree that is close to the calculated glossiness effect degree from the environment light map storage section 341B (step 41). In the present exemplary embodiment, the glossiness effect degree of the environment image is 1.3. Therefore, the environment light map selection section 313B selects the environment light map collection AA with a glossiness effect degree of 1.4.

Next, the environment light map selection section 313B converts environment light maps of the selected environment light map collection (environment light map collection AA) into HSV values (step 42).

Subsequently, the environment light map selection section 313B calculates a hue difference and a saturation difference between the environment image and the environment light maps (step 43).

Figure 19:
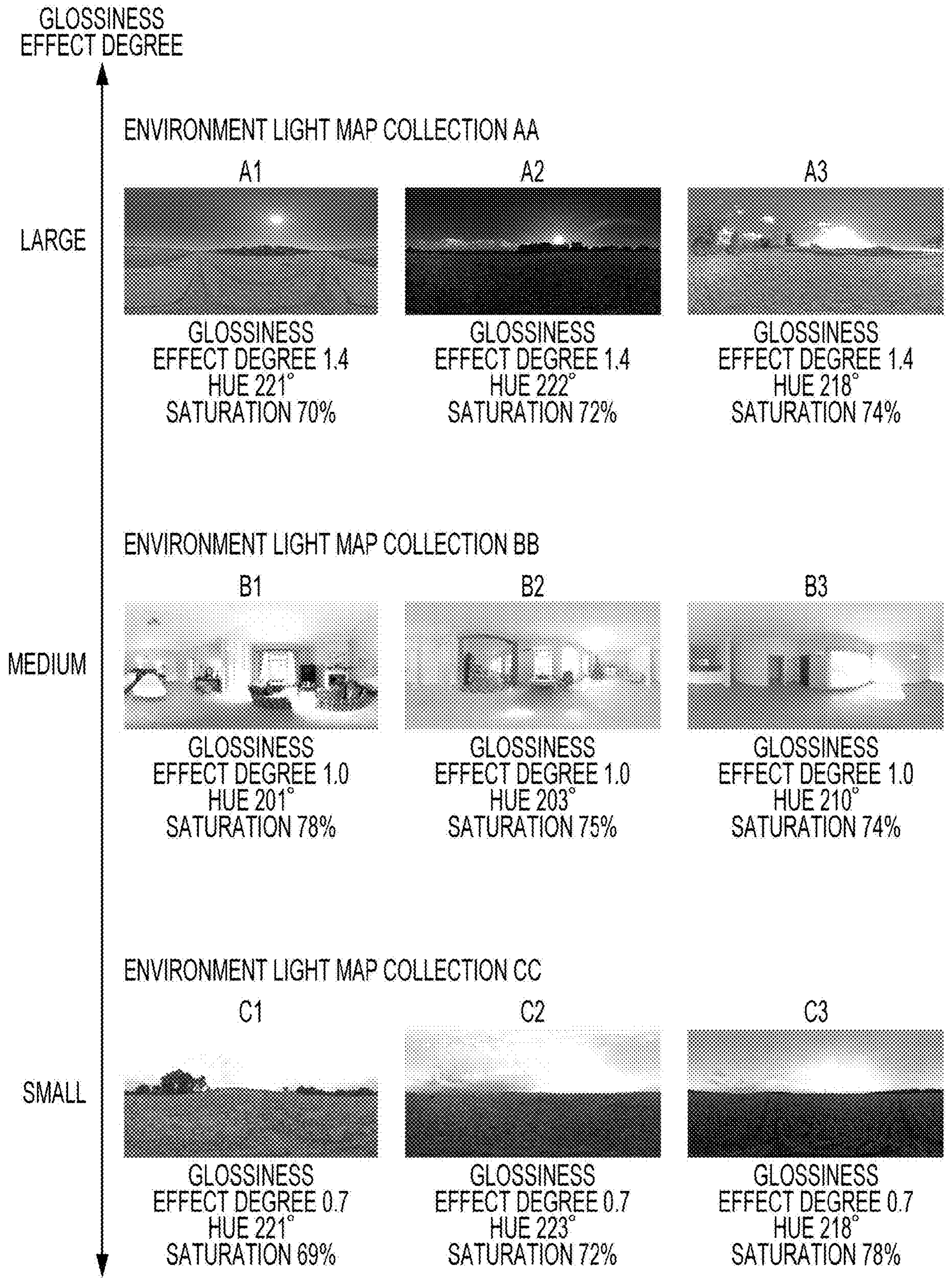
FIG. 19 illustrates image examples of environment light map collections stored in an environment light map storage section.

FIG. 19 illustrates image examples of environment light map collections AA, BB, and CC stored in the environment light map storage section 341B (see FIG. 16).

The vertical axis in FIG. 19 also indicates the glossiness effect degree. In FIG. 19, the glossiness effect degree becomes larger toward the upper side, and becomes smaller toward the lower side.

Also in FIG. 19, the environment light maps are illustrated as omnidirectional panoramic images in which an omnidirectional image is projected onto a two-dimensional plane using equidistant cylindrical projection.

Due to space limitations, only three environment light maps that belong to each environment light map collection are illustrated.

The environment light map collection AA includes omnidirectional images that include a point light source such as LED illumination. The environment light map A1 has a glossiness effect degree of 1.4, a hue of 221°, and a saturation of 70%. The environment light map A2 has a glossiness effect degree of 1.4, a hue of 222°, and a saturation of 72%. The environment light map A3 has a glossiness effect degree of 1.4, a hue of 218°, and a saturation of 74%.

In step 43, a hue difference and a saturation difference from the environment image are calculated for the environment light maps A1, A2, A3, . . . .

For example, the hue difference and the saturation difference between the environment image and the environment light map A1 are calculated as −11° (=210°−221°) and 14% (=84%−70%), respectively.

Similarly, the hue difference and the saturation difference between the environment image and the environment light map A2 are calculated as −12° (=210°−222°) and 12% (=84%−72%), respectively, and the hue difference and the saturation difference between the environment image and the environment light map A3 are calculated as −8° (=210°−218°) and 10% (=84%−74%), respectively.

For reference, the environment light map collection BB includes omnidirectional images that include a surface light source such as organic EL illumination. The environment light map B1 has a glossiness effect degree of 1.0, a hue of 201°, and a saturation of 78%. The environment light map B2 has a glossiness effect degree of 1.0, a hue of 203°, and a saturation of 75%. The environment light map B3 has a glossiness effect degree of 1.0, a hue of 210°, and a saturation of 74%.

The environment light map collection CC includes omnidirectional images that include uniform diffusion light source such as illumination with a diffusion plate. The environment light map C1 has a glossiness effect degree of 0.7, a hue of 221°, and a saturation of 69%. The environment light map C2 has a glossiness effect degree of 0.7, a hue of 223°, and a saturation of 72%. The environment light map C3 has a glossiness effect degree of 0.7, a hue of 218°, and a saturation of 78%.

After that, the environment light map selection section 313A selects an environment light map with the smallest hue difference and saturation difference (step 44). For example, when a plurality of environment light maps with the smallest hue difference are found, an environment light map with the smallest saturation difference is selected. When a plurality of environment light maps with the smallest saturation difference are found, any one of the environment light maps is selected.

The environment light map selection section 313B according to the present exemplary embodiment selects an environment light map with not only a glossiness effect degree but also a chromaticity that is close to that of the environment image, and outputs the selected environment light map to the glossiness reproduction section 314. In the example in FIG. 19, the environment light map A3 is output to the glossiness reproduction section 314.

Fourth Exemplary Embodiment

Another method of enhancing the degree of reproducibility of the glossiness of an article will be described in accordance with the present exemplary embodiment.

Also in the present exemplary embodiment, the print system 1 illustrated in FIG. 1 is assumed.

<Overview of Texture Reproduction Process>

Figure 20:
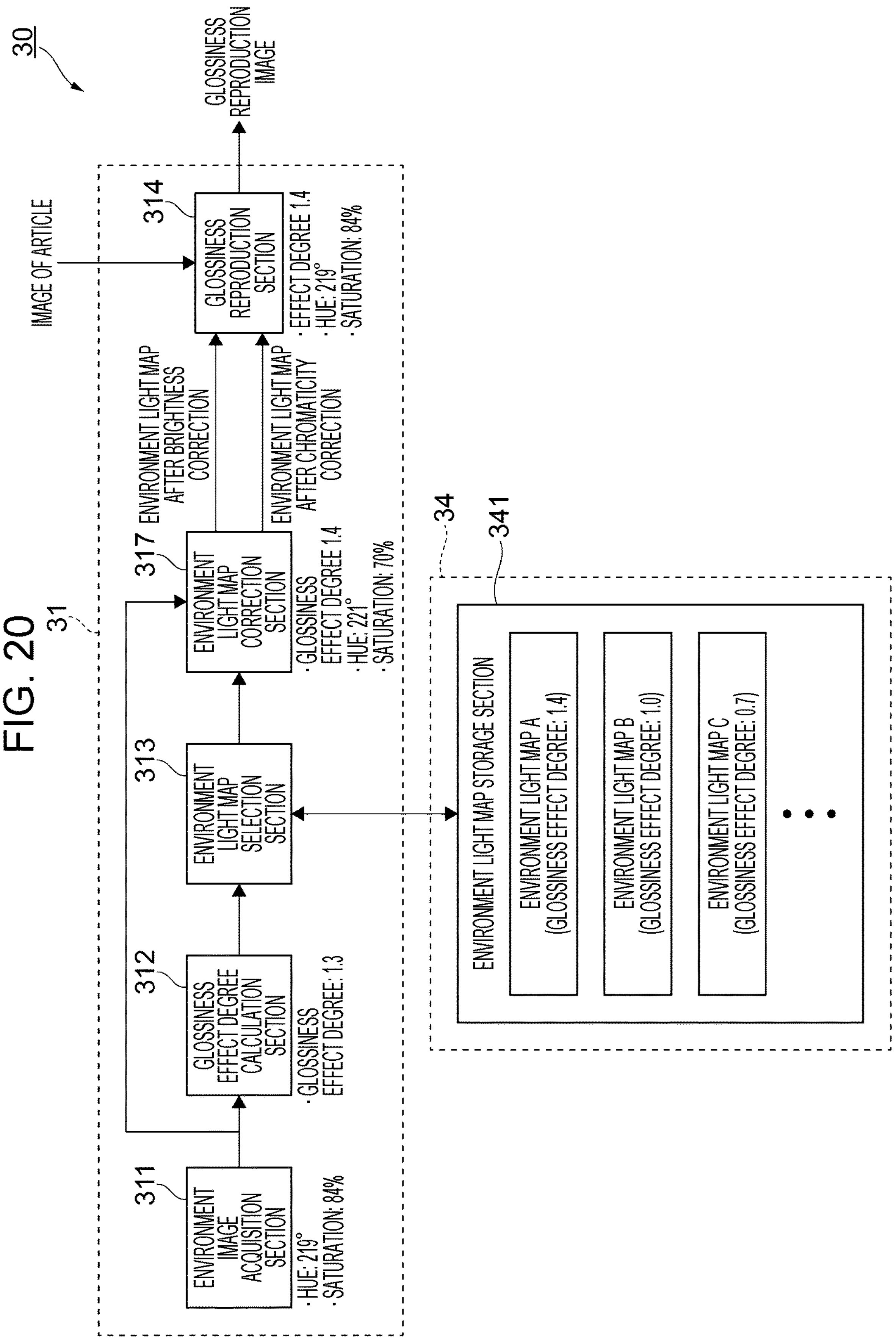
FIG. 20 illustrates an example of the functional configuration of a print server assumed in a fourth exemplary embodiment.

FIG. 20 illustrates an example of the functional configuration of a print server 30 assumed in a fourth exemplary embodiment. In FIG. 20, portions corresponding to those in FIG. 4 are denoted by corresponding reference signs.

The exemplary embodiment in FIG. 20 is the same as the first exemplary embodiment in that the environment light map storage section 341 stores one environment light map for each glossiness effect degree.

The exemplary embodiment is also the same as the first exemplary embodiment in that the environment light map selection section 313 selects an environment light map with a glossiness effect degree that is close to that of the environment image.

The difference is that the environment light map selected by the environment light map selection section 313 is corrected to be closer to the illumination environment of the environment image.

To this end, an environment light map correction section 317 is additionally provided in FIG. 20.

The environment light map correction section 317 receives an input of the environment image acquired by the environment image acquisition section 311 and the environment light map selected by the environment light map selection section 313.

Figure 21:
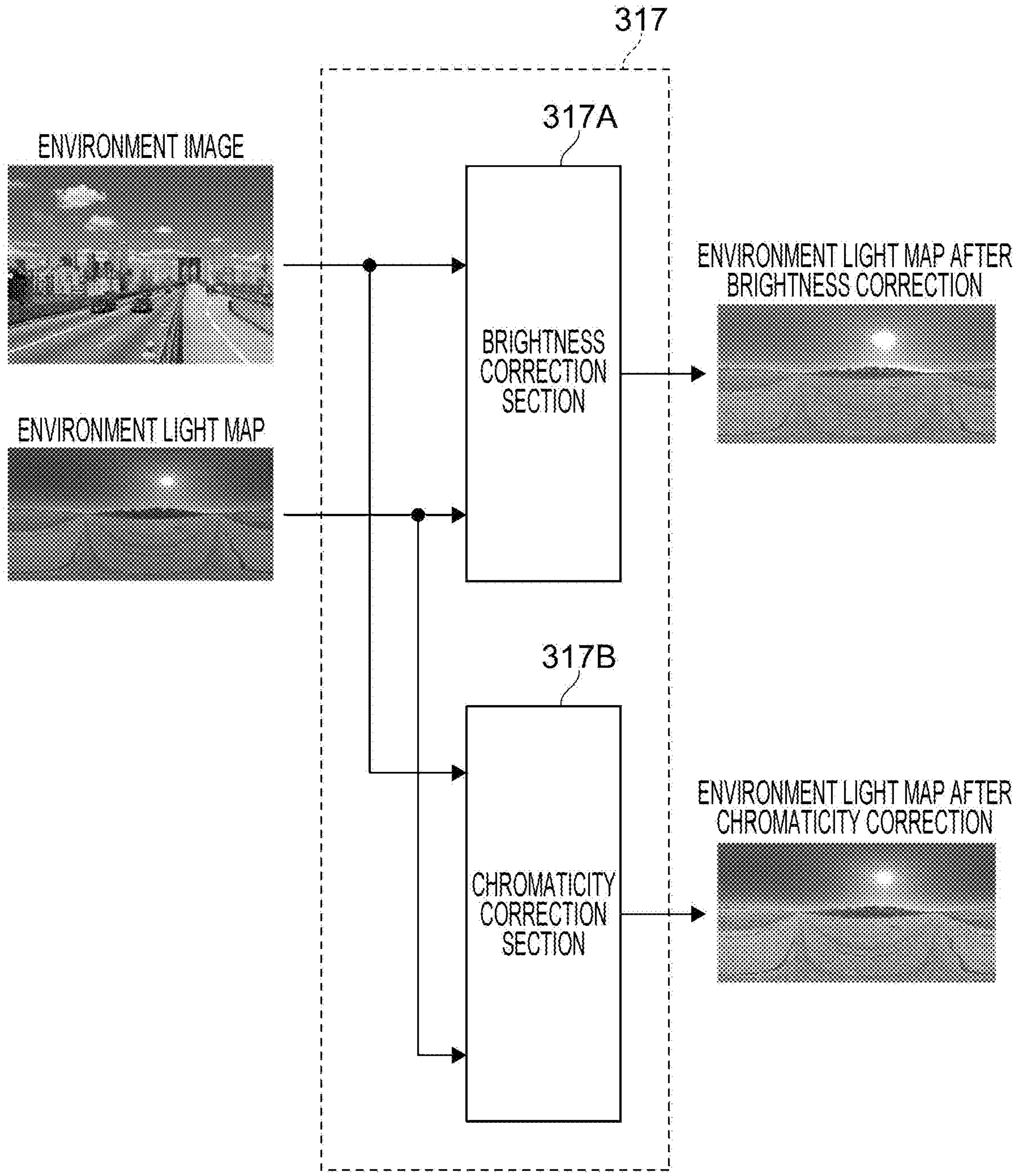
FIG. 21 illustrates an example of the functional configuration of an environment light map correction section that is used in the fourth exemplary embodiment.

FIG. 21 illustrates an example of the functional configuration of the environment light map correction section 317 that is used in the fourth exemplary embodiment.

In the present exemplary embodiment, the environment light map correction section 317 is composed of a brightness correction section 317A that corrects the average brightness of the environment light map to be closer to the illumination environment of the environment image, and a chromaticity correction section 317B that corrects the chromaticity of the environment light map to be closer to the illumination environment of the environment image.

The environment light map with the average brightness corrected by the brightness correction section 317 and the environment light map with the chromaticity corrected by the chromaticity correction section 317B are each output to the glossiness reproduction section 314.

Thus, the glossiness reproduction section 314 according to the present exemplary embodiment reproduces the glossiness of an article using the corrected environment light maps.

Specifically, in generating a rendered image, the environment light map with the corrected brightness is used for the average brightness of the illumination environment at the observation location, and the environment light map with the corrected chromaticity is used for the chromaticity of the illumination environment at the observation location.

<Details of Texture Reproduction Process>

Process operation executed by the various functional sections will be described in detail below.

<Environment Light Map Correction Section>

Figure 22:
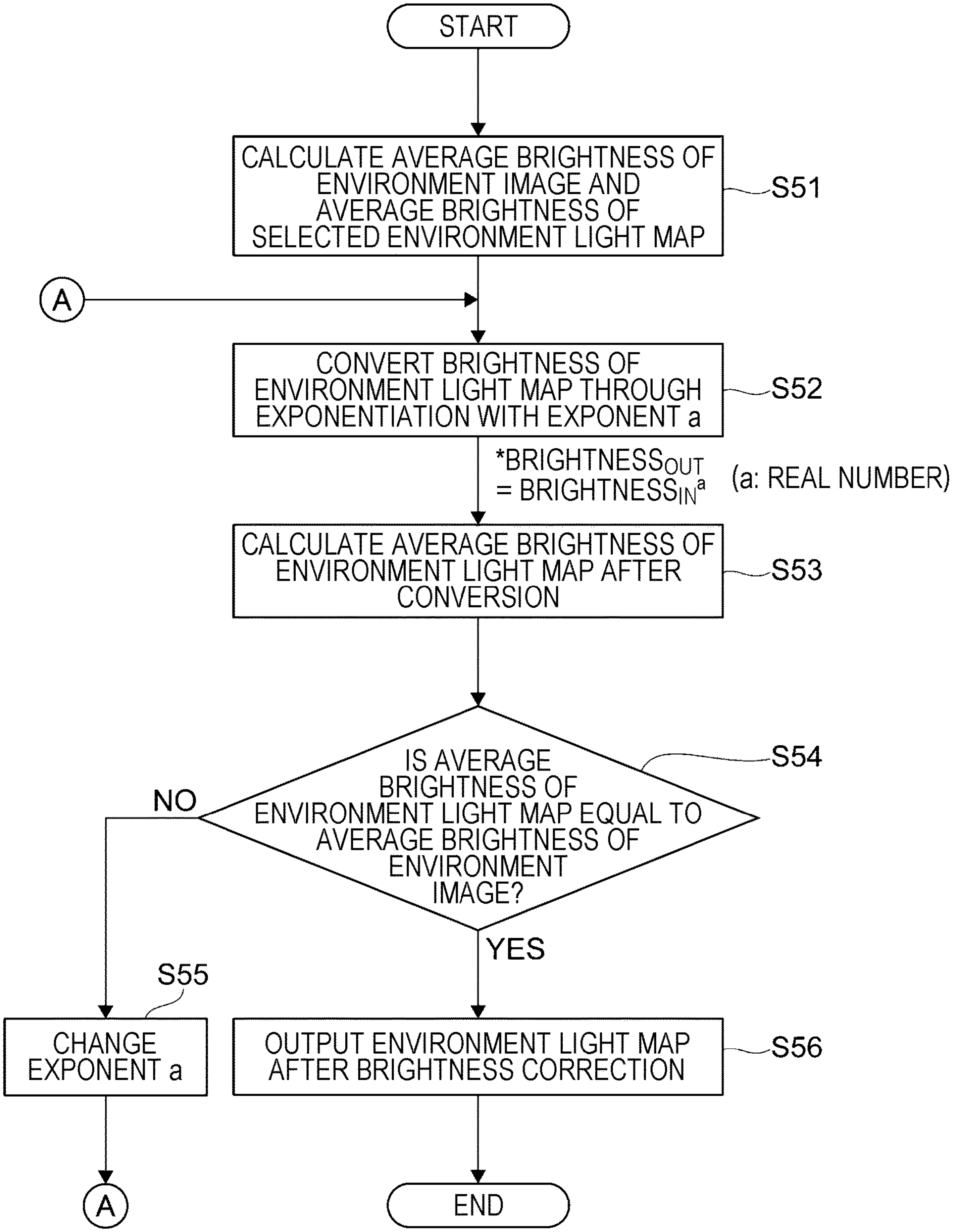
FIG. 22 is a flowchart illustrating an example of process operation executed by a brightness correction section that is used in the fourth exemplary embodiment.

FIG. 22 is a flowchart illustrating an example of process operation executed by the brightness correction section 317A (see FIG. 21) that is used in the fourth exemplary embodiment.

First, the brightness correction section 317A calculates an average brightness of an environment image and an average brightness of a selected environment light map (step 51). The brightness of each pixel is calculated as 0.299×R+0.587×G+0.114×B, for example.

Next, the brightness correction section 317A converts the brightness of the environment light map through exponentiation with an exponent a (step 52). The exponent a is a real number.

When the brightness before the conversion is defined as $\text{brightness}_{IN}$ and the brightness after the conversion is defined as $\text{brightness}_{OUT}$, the conversion is performed by the following equation.

$$\text{Brightness}_{OUT}=\text{brightness}_{IN}^{a}$$

Subsequently, the brightness correction section 317A calculates an average brightness of the environment light map after the conversion (step 53).

After the calculation, the brightness correction section 317A determines whether or not the average brightness of the environment light map is equal to the average brightness of the environment image (step 54).

It may be determined in step 54 whether or not the difference between the average brightness of the environment light map and the average brightness of the environment image is less than a threshold. The threshold is given in advance.

When the average brightness of the environment light map and the average brightness of the environment image are different from each other, a negative result is obtained in step 54. In this case, the brightness correction section 317A changes the exponent a (step 55), and the process returns to step 52.

The exponent a may be increased or decreased by a fixed value, or the amount of increase or the amount of decrease may be determined in accordance with the difference between the average brightness of the environment light map and the average brightness of the environment image.

The direction of increasing or decreasing the exponent a is changed when the average brightness of the environment light map which has been more than the average brightness of the environment image becomes less than the average brightness of the environment image or when the average brightness of the environment light map which has been less than the average brightness of the environment image becomes more than the average brightness of the environment image. For example, the exponent a is decreased when the magnitude relationship between the average brightnesses is reversed as a result of increasing the exponent a.

Alternatively, the exponent a may be obtained as a result of inputting an environment light map and an environment image to a learning model that has learned the relationship between an environment light map and an environment image as inputs and the exponent a as an output through machine learning.

When the average brightness of the environment light map and the average brightness of the environment image are equal to each other, a positive result is obtained in step 54. In this case, the brightness correction section 317A outputs the environment light map after the brightness correction (step 56).

<Chromaticity Correction Section>

Figure 23:
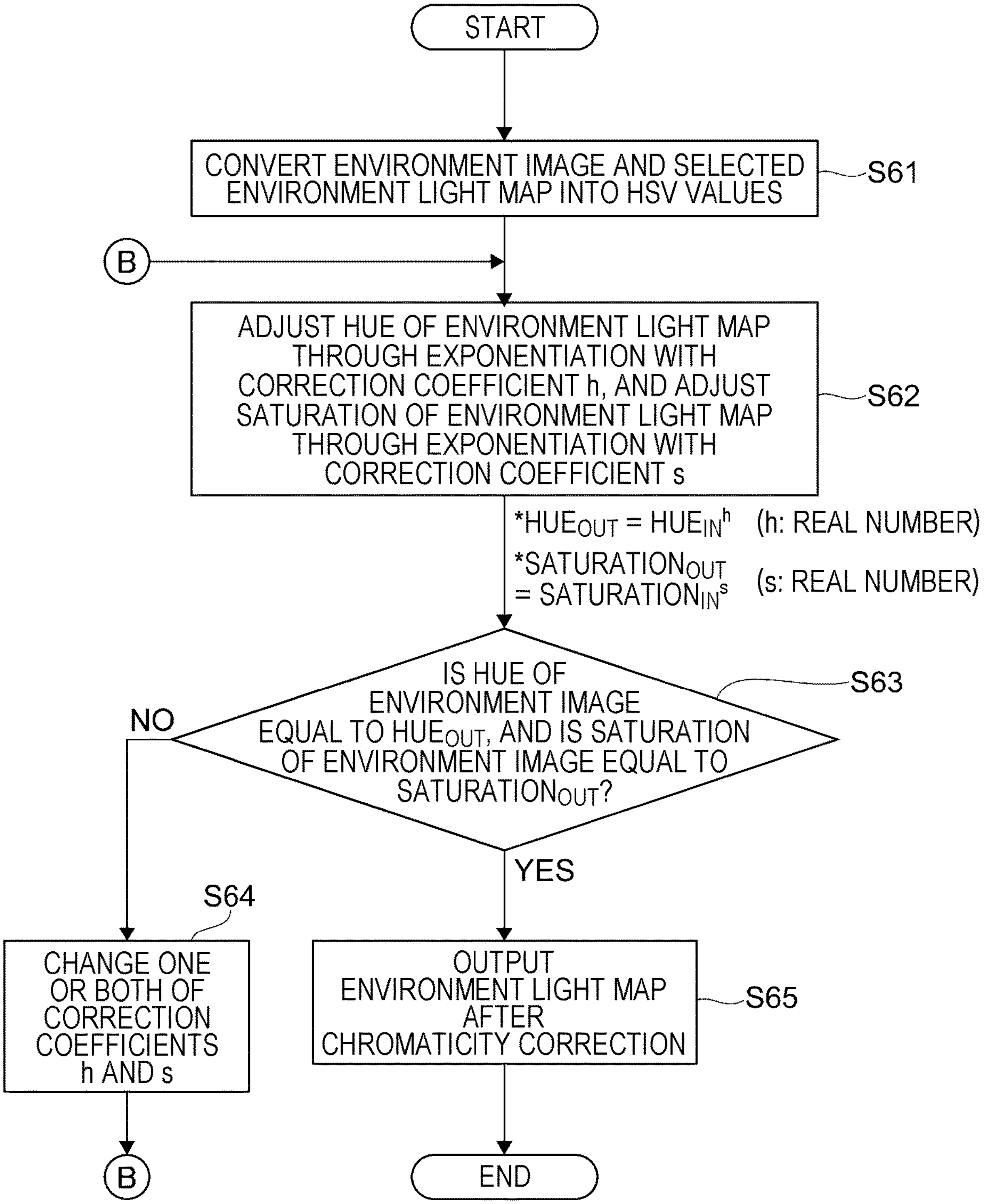
FIG. 23 is a flowchart illustrating an example of process operation executed by a chromaticity correction section that is used in the fourth exemplary embodiment.

FIG. 23 is a flowchart illustrating an example of process operation executed by the chromaticity correction section 317B (see FIG. 21) that is used in the fourth exemplary embodiment.

The chromaticity correction section 317B converts the environment image and the selected environment light map into HSV values (step 61). The equations for conversion indicated in FIG. 17 are used for conversion into HSV values.

Next, the chromaticity correction section 317B adjusts the hue of the environment light map through exponentiation with a correction coefficient h, and adjusts the saturation of the environment light map through exponentiation with a correction coefficient s (step 62). The coefficients h and s are real numbers.

When the hue before the adjustment is defined as $\text{hue}_{IN}$ and the hue after the adjustment is defined as $\text{hue}_{OUT}$, the adjustment is performed using the following equation.

$$\text{Hue}_{OUT}=\text{hue}_{IN}^{h}$$

Similarly, when the saturation before the adjustment is defined as $\text{saturation}_{IN}$ and the saturation after the adjustment is defined as $\text{saturation}_{OUT}$, the adjustment is performed using the following equation.

$$\text{Saturation}_{OUT}=\text{saturation}_{IN}^{S}$$

Subsequently, the chromaticity correction section 317B determines whether or not the hue of the environment image is equal to the $\text{hue}_{OUT}$ of the environment light map and the saturation of the environment image is equal to the $\text{saturation}_{OUT}$ of the environment light map (step 63).

In step 63, it may be determined whether or not the difference between the hue of the environment light map and the hue of the environment image is less than a threshold, and it may be determined whether or not the difference between the saturation of the environment light map and the saturation of the environment image is less than a threshold. The threshold is given in advance.

When at least one of the hue and the saturation of the environment light map is different from the corresponding value of the environment image, a negative result is obtained in step 63. In this case, the brightness correction section 317A changes one or both of the correction coefficients h and s (step 64), and the process returns to step 62.

The correction coefficients h and s may be changed in the same manner as the exponent a is changed in step 55 (see FIG. 22).

When the hue and the saturation of the environment light map are equal to the corresponding values of the environment image, a positive result is obtained in step 63. In this case, the chromaticity correction section 317B outputs the environment light map after the chromaticity correction (step 65).

<Overview of Process>

Figure 24:
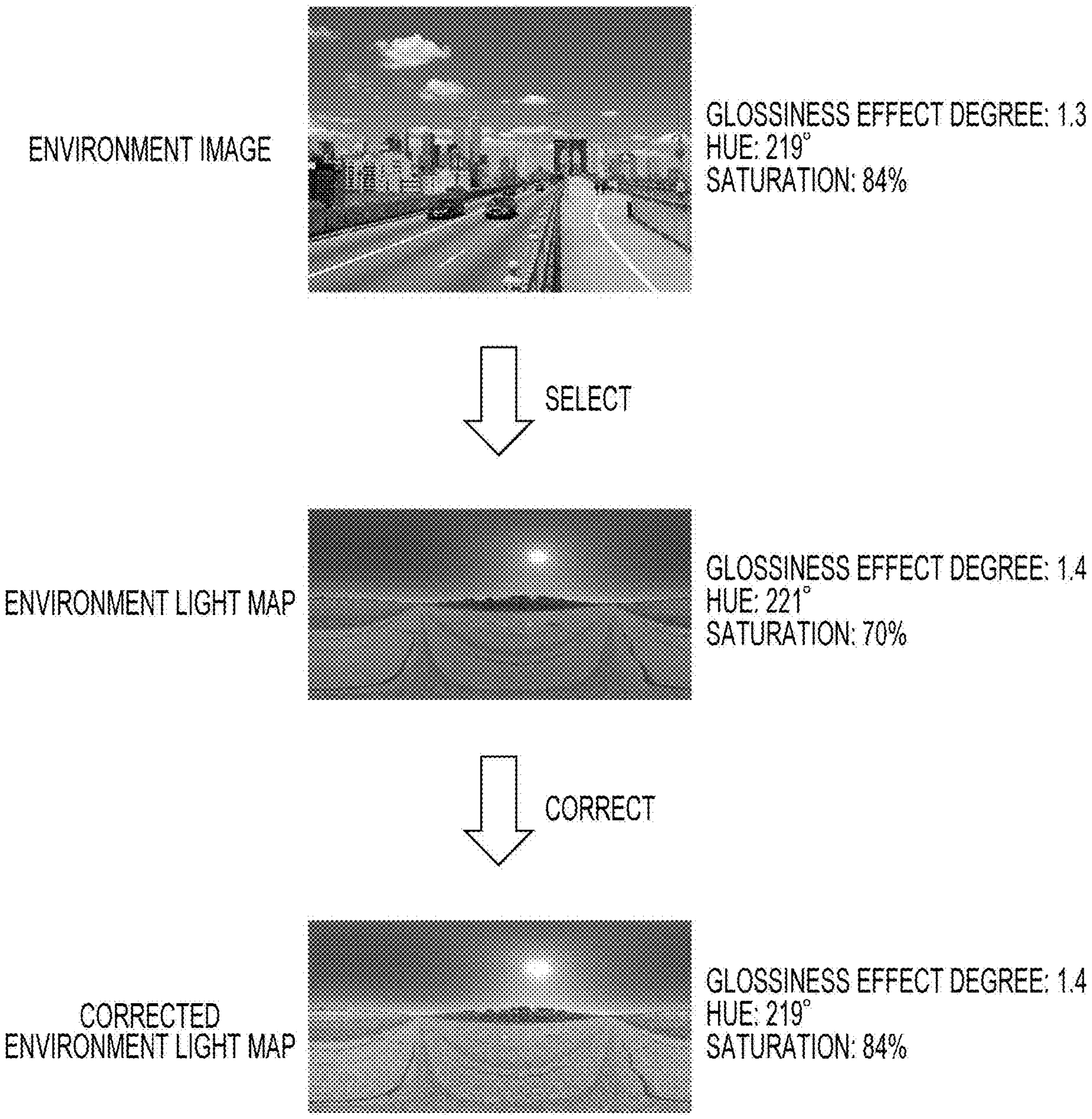
FIG. 24 illustrates an overview of a process executed in the fourth exemplary embodiment.

FIG. 24 illustrates an overview of a process executed in the fourth exemplary embodiment.

When an environment image is given, first, an environment light map with a glossiness effect degree that is close to that of the environment image is selected by the environment light map selection section 313 (see FIG. 20).

In the present exemplary embodiment, an environment light map with a glossiness effect degree of 1.4 is selected for an environment image with a glossiness effect degree of 1.3.

The selected environment light map and the environment image have different hues and saturations. For example, the environment light map has a hue of 221° while the environment image has a hue of 219°. The environment light map has a saturation of 70% while the environment image has a saturation of 84%.

In this manner, the chromaticity of the selected environment light map is different from the chromaticity at the observation location.

Thus, in the present exemplary embodiment, the selected environment light map is corrected such that the hue and the saturation of the corrected environment light map coincide with those of the environment image.

As a result, it is possible to improve the reproduction degree of the chromaticity compared to before the correction.

Although not illustrated in FIG. 24, it is possible to bring the glossiness effect degree of the environment light map closer to that of the environment image by correcting the average brightness of the environment light map.

In the present exemplary embodiment, a glossiness effect degree is calculated on the basis of the standard deviation and the distortion degree of the brightness, and thus the glossiness effect degree of the environment light map may be varied by causing the average brightness of the environment light map to coincide with the average brightness of the environment image.

However, the glossiness effect degree of the environment light map before the correction is originally close to the glossiness effect degree of the environment image, and thus it is expected that the illumination environment of the environment light map is brought closer to the illumination environment at the observation location by causing the average brightness of the environment light map to coincide with the average brightness of the environment image.

While the present exemplary embodiment is based on the method according to the first exemplary embodiment, the present exemplary embodiment may be combined with the method according to the second exemplary embodiment, or may be combined with the method according to the third exemplary embodiment.

While the brightness of the environment light map is corrected such that the average brightness of the environment light map becomes equal to the average brightness of the environment image in the present exemplary embodiment, the brightness of the environment light map may be corrected such that the glossiness effect degree of the environment light map coincides with that of the environment image.

Fifth Exemplary Embodiment

A modification of the fourth exemplary embodiment will be described as the present exemplary embodiment.

While both the average brightness and the chromaticity of the environment light map are corrected in the fourth exemplary embodiment, only the chromaticity of the environment light map is corrected in the present exemplary embodiment.

Figure 25:
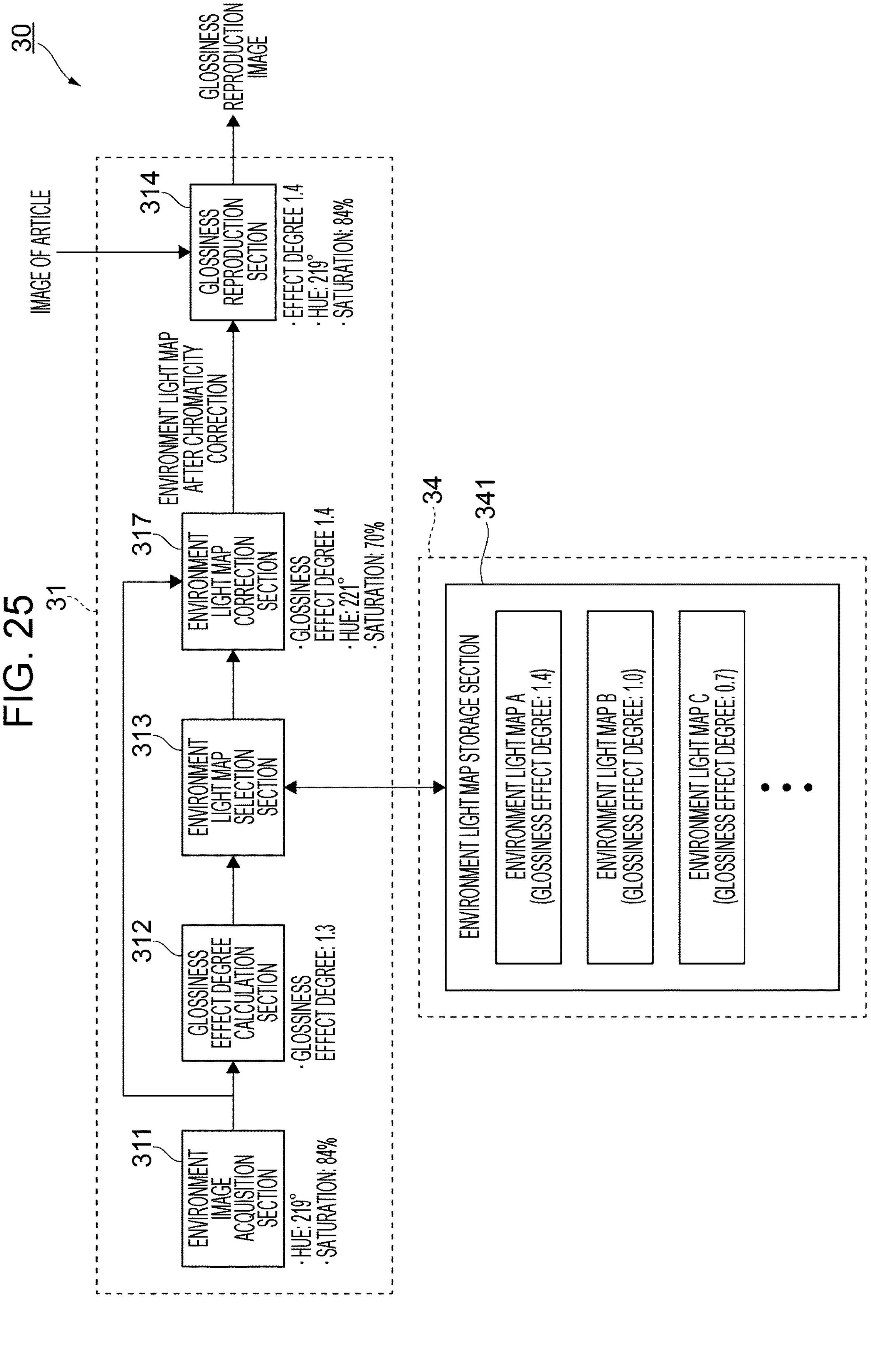
FIG. 25 illustrates an example of the functional configuration of a print server assumed in a fifth exemplary embodiment.

FIG. 25 illustrates an example of the functional configuration of a print server 30 assumed in a fifth exemplary embodiment. In FIG. 25, portions corresponding to those in FIG. 20 are denoted by corresponding reference signs.

The environment light map correction section 317 in FIG. 25 has only the chromaticity correction function of the environment light map correction section 317 (see FIG. 20). Therefore, the environment light map correction section 317 outputs only the environment light map after the chromaticity correction to the glossiness reproduction section 314.

Sixth Exemplary Embodiment

Another method of enhancing the degree of reproducibility of the glossiness of an article will be described in accordance with the present exemplary embodiment.

Also in the present exemplary embodiment, the print system 1 illustrated in FIG. 1 is assumed.

<Overview of Texture Reproduction Process>

Figure 26:
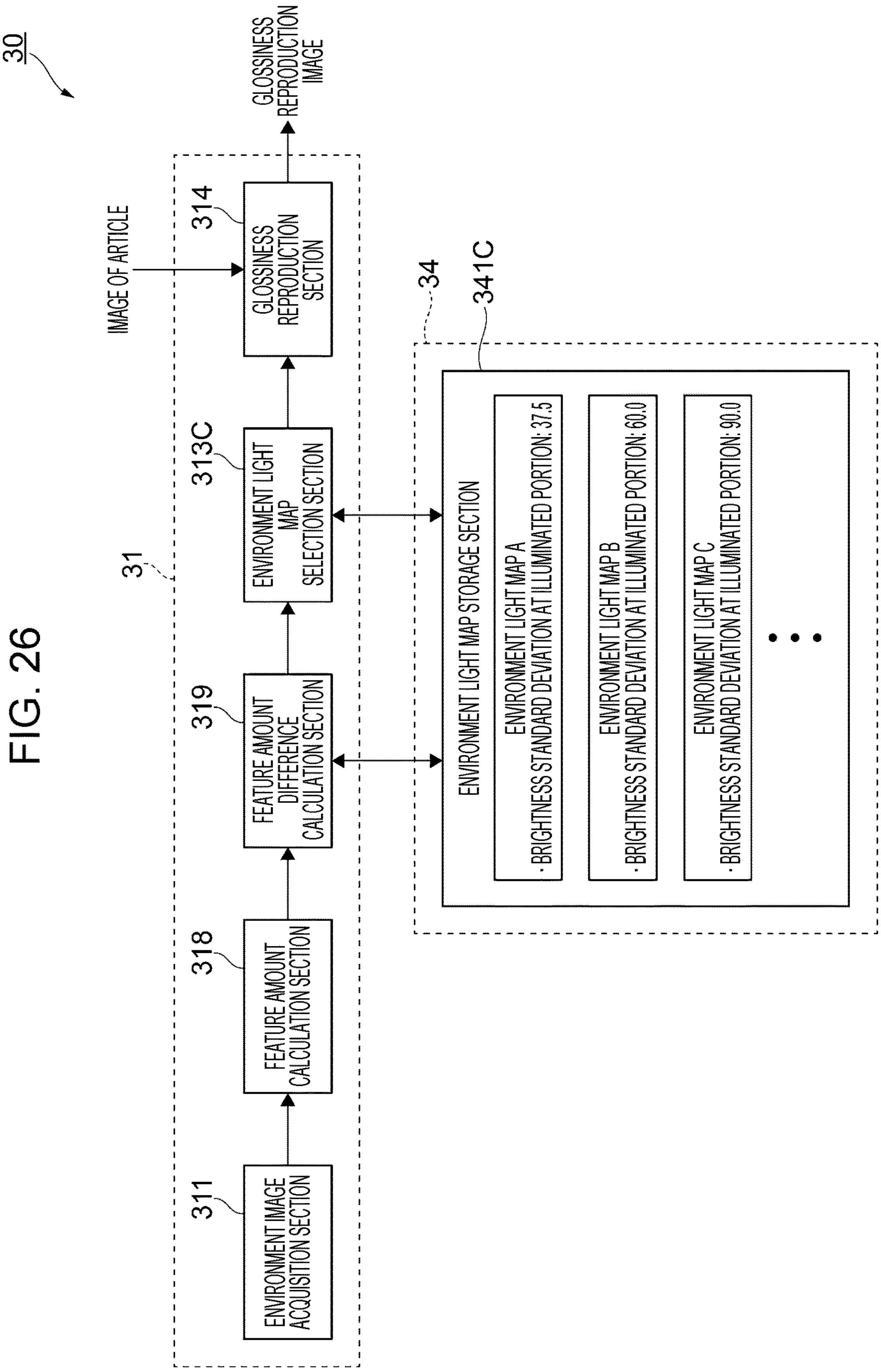
FIG. 26 illustrates an example of the functional configuration of a print server assumed in a sixth exemplary embodiment.

FIG. 26 illustrates an example of the functional configuration of a print server 30 assumed in a sixth exemplary embodiment. In FIG. 26, portions corresponding to those in FIG. 4 are denoted by corresponding reference signs.

One of features that are peculiar to the print server 30 illustrated in FIG. 26 is that a glossiness effect degree of an environment image is not calculated. Therefore, the print server 30 illustrated in FIG. 26 is not provided with the glossiness effect degree calculation section 312 (see FIG. 4).

Instead, the print server 30 illustrated in FIG. 26 is provided with a feature amount calculation section 318 that calculates a feature amount of an environment image, and a feature amount difference calculation section 319 that calculates the difference between the calculated feature amount and a brightness standard deviation of an illuminated portion of the environment light map stored in the environment light map storage section 341C.

In the present exemplary embodiment, a brightness standard deviation of the illuminated portion calculated in advance is linked to the environment light map stored in the environment light map storage section 341C. For example, "37.5" is linked to the environment light map A, "60.0" is linked to the environment light map B, and "90.0" is linked to the environment light map C.

The environment light map selection section 313C in the print server 30 illustrated in FIG. 26 has a function of specifying a minimum value of difference values given from the feature amount difference calculation section 319 and selecting an environment light map corresponding to the specified difference value.

In this manner, in the present exemplary embodiment, the environment light map selection section 313C selects an environment light map with a feature amount (i.e. the brightness standard deviation of the illuminated portion) that is highly similar to that at the observation location. In other words, an environment light map is selected with focus on the similarity of a feature amount of a principal illuminated portion, rather than the similarity for the entire screen.

<Details of Texture Reproduction Process>

Differences from the first exemplary embodiment will be described below.

<Environment Image Acquisition Section>

Figure 27:
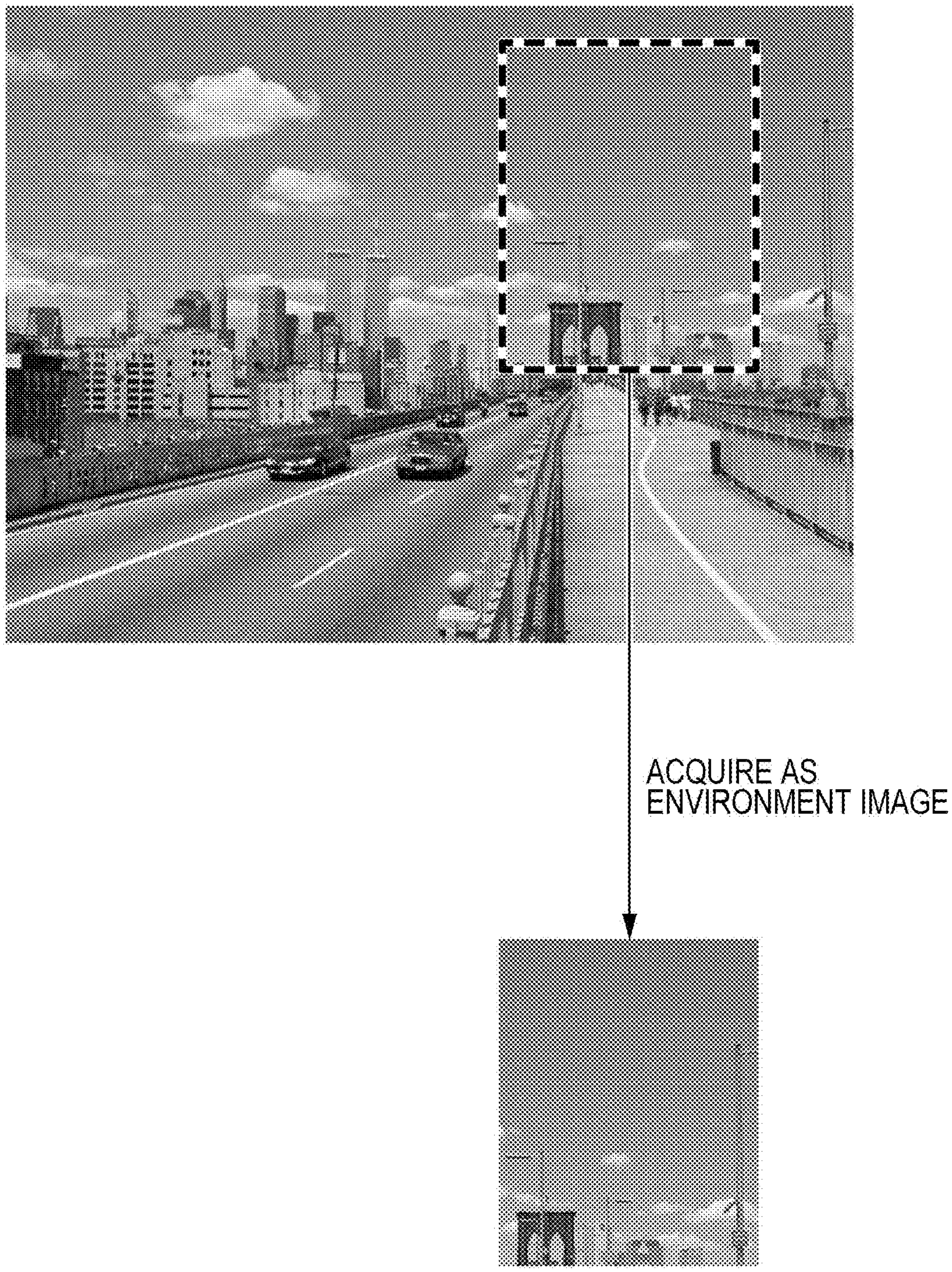
FIG. 27 illustrates an example of acquisition of an environment image by an environment image acquisition section in the sixth exemplary embodiment.

FIG. 27 illustrates an example of acquisition of an environment image by the environment image acquisition section 311 in the sixth exemplary embodiment. FIG. 27 illustrates a photograph of a highway under the blue sky. Principal illumination in this photograph is the blue sky. Therefore, a portion of the blue sky surrounded by the broken line is acquired as an environment image. The term "principal illumination" refers to a region with a high brightness compared to the other regions and with a larger light source area compared to the other regions.

The range to be acquired as an environment image may be specified by the user.

Alternatively, an environment image captured at an observation location may be input to a machine learning model that outputs a principal illuminated portion of an input image. Alternatively, a region that includes a lighting fixture may be extracted as an environment image using an image recognition technology.

<Feature Amount Calculation Section>

Figure 28:
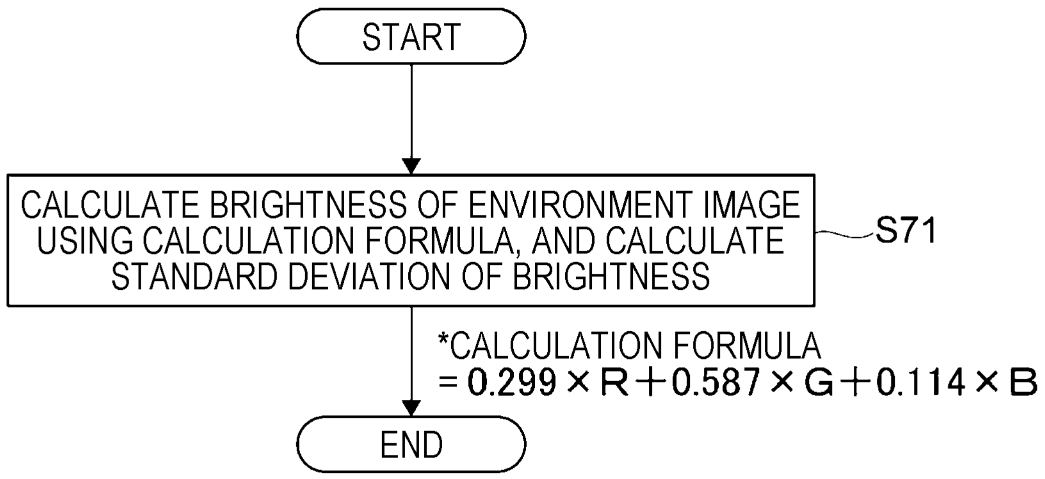
FIG. 28 is a flowchart illustrating an example of process operation executed by a feature amount calculation section that is used in the sixth exemplary embodiment.

FIG. 28 is a flowchart illustrating an example of process operation executed by the feature amount calculation section 318 that is used in the sixth exemplary embodiment.

The feature amount calculation section 318 calculates a brightness of an environment image using a calculation formula, and calculates a standard deviation of the brightness (i.e. a brightness standard deviation) (step 71). The calculation formula may be 0.299×R+0.587×G+0.114×B, for example. The brightness standard deviation is an example of a "feature amount related to brightness distribution".

The brightness is calculated for each pixel, and the brightness standard deviation is calculated for the entire environment image (i.e. principal illuminated portion).

<Process of Linking Standard Deviation to Environment Light Map>

Figure 29:
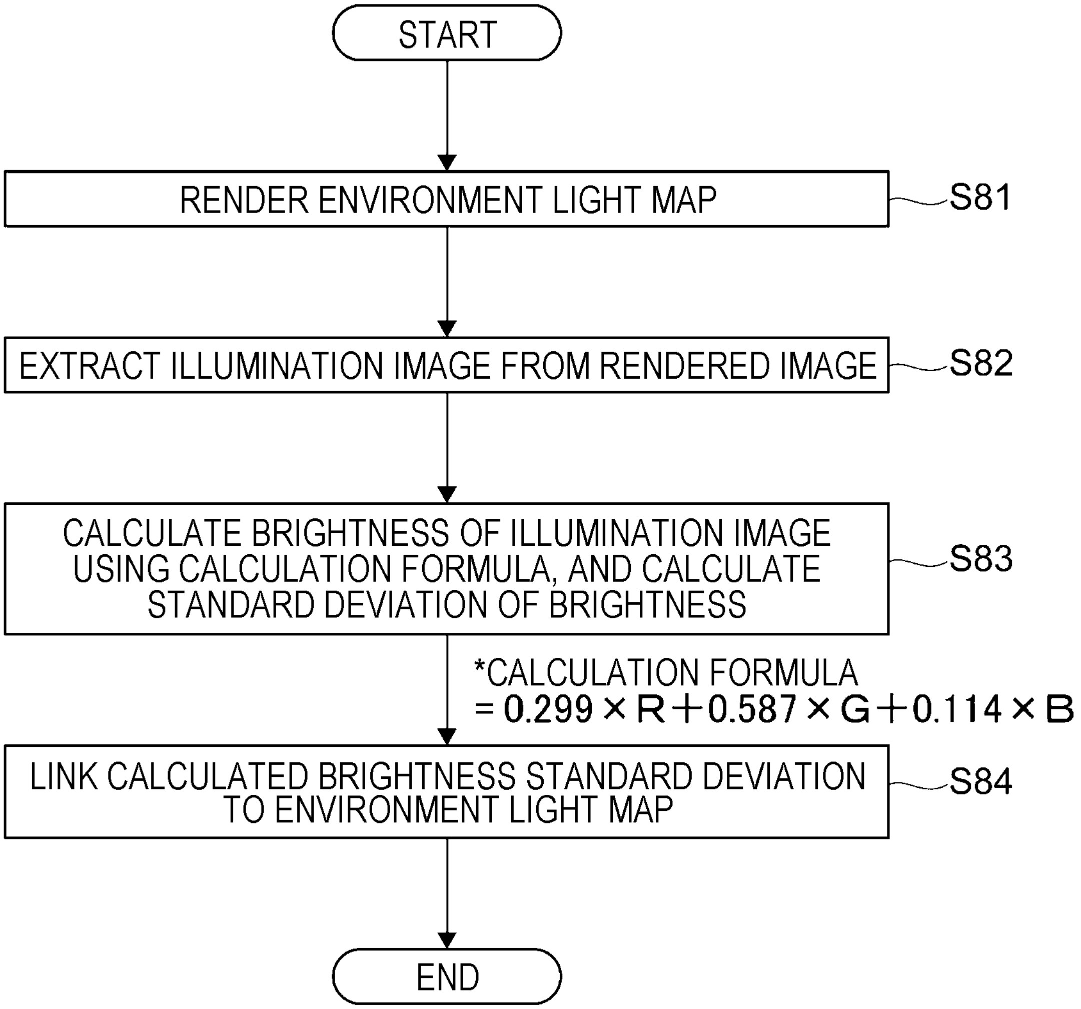
FIG. 29 is a flowchart illustrating a process of linking a brightness standard deviation to environment light maps stored in an environment light map storage section.

FIG. 29 is a flowchart illustrating a process of linking a brightness standard deviation to environment light maps stored in the environment light map storage section 341C.

In the present exemplary embodiment, the processor 31 (see FIG. 26) of the print server 30 is assumed as a processor that executes this process. The process itself may be executed by a different processor.

First, the processor 31 renders an environment light map stored in the environment light map storage section 341C (step 81). The "environment light map" is an omnidirectional image.

Next, the processor 31 extracts an illumination image from the rendered image (step 82). The "illumination image" refers to a partial image that includes principal illumination. The term "principal illumination" refers to a region with a high brightness compared to the other regions and with a larger light source area compared to the other regions.

Subsequently, the processor 31 calculates a brightness of the illumination image using a calculation formula, and calculates a standard deviation (i.e. brightness standard deviation) of the brightness (step 83). The calculation formula may be 0.299×R+0.587×G+0.114×B, for example. The brightness standard deviation is obtained by rounding off a calculated value to the first decimal place, for example.

After that, the processor 31 links the calculated brightness standard deviation to the environment light map (step 84).

Figure 30:
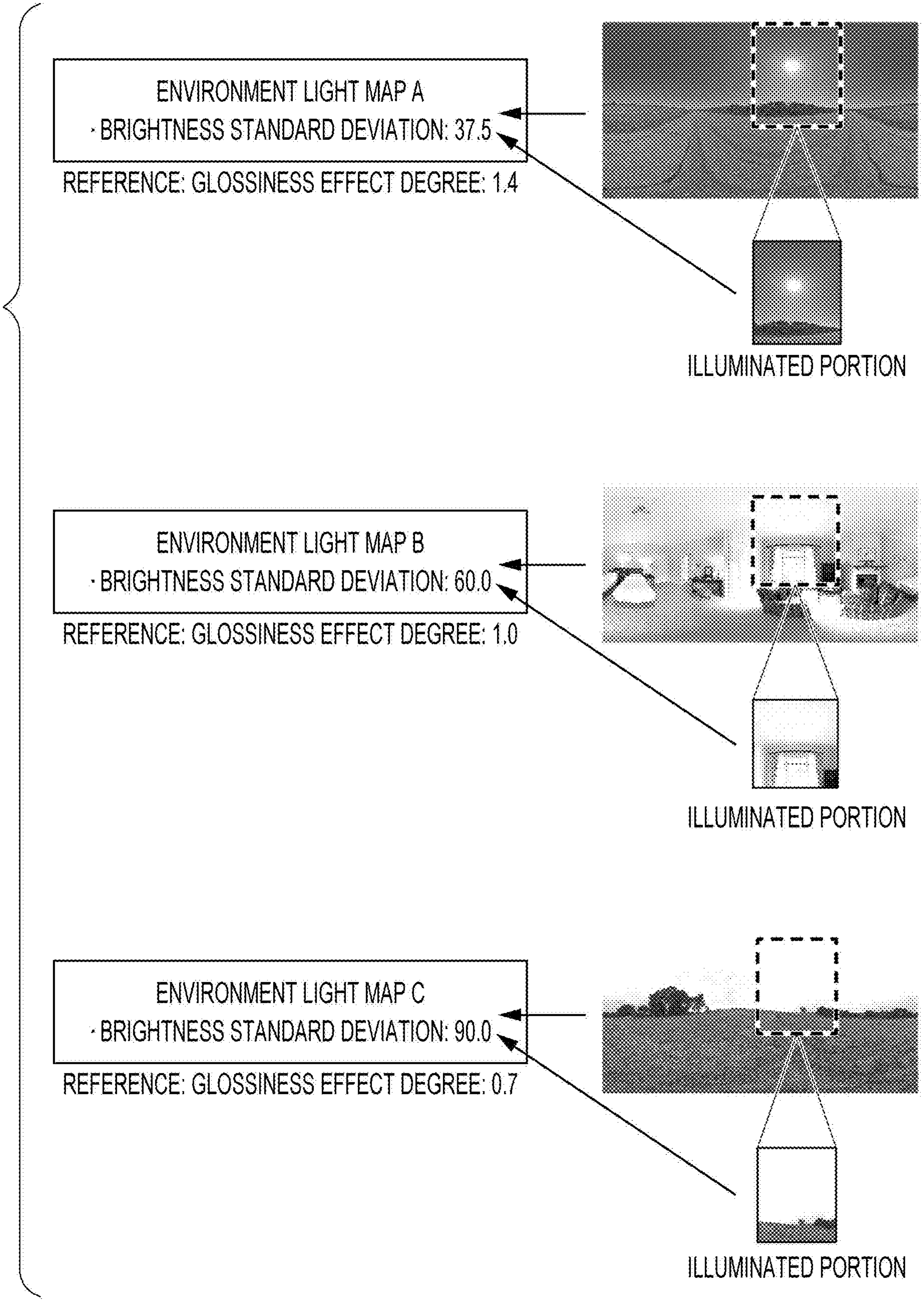
FIG. 30 illustrates the relationship of linking between the environment light maps and the brightness standard deviation.

FIG. 30 illustrates the relationship of linking between the environment light maps and the brightness standard deviation.

The brightness standard deviation of the illuminated portion surrounded by the broken line is linked to the environment light map A. In this example, the brightness standard deviation is 37.5. For reference, the environment light map A has a glossiness effect degree of 1.4.

Similarly, the brightness standard deviation of the illuminated portion surrounded by the broken line is linked to the environment light map B. In this example, the brightness standard deviation is 60.0. For reference, the environment light map B has a glossiness effect degree of 1.0.

The brightness standard deviation of the illuminated portion surrounded by the broken line is linked to the environment light map C. In this example, the brightness standard deviation is 90.0. For reference, the environment light map C has a glossiness effect degree of 0.7.

While an illumination image is extracted from the rendered image in the example in FIG. 29, an illumination image may be directly extracted from the environment light map. In that case, step 81 (see FIG. 29) is not necessary.

<Feature Amount Difference Calculation Section>

Figure 31:
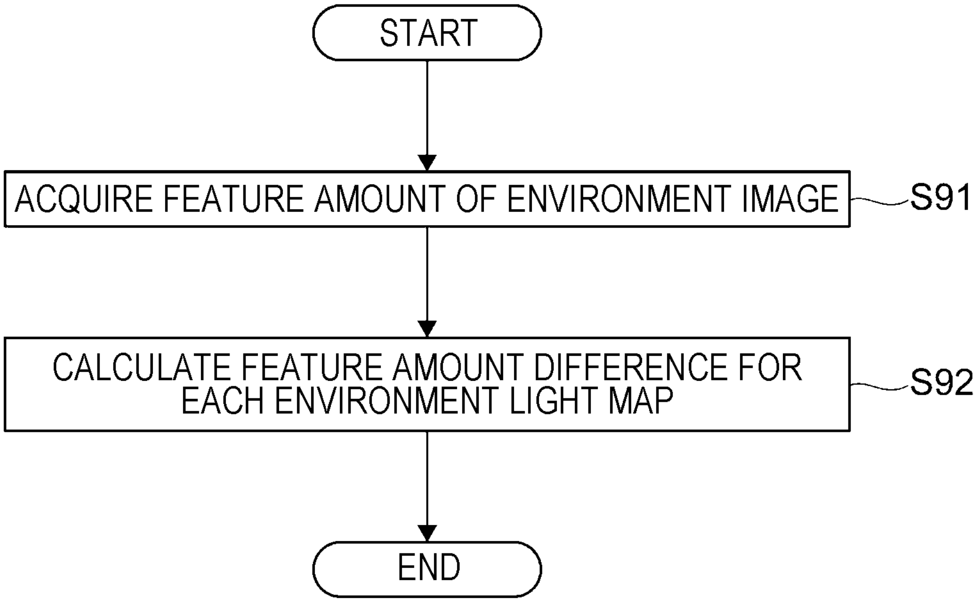
FIG. 31 is a flowchart illustrating an example of process operation executed by a feature amount difference calculation section that is used in the sixth exemplary embodiment.

FIG. 31 is a flowchart illustrating an example of process operation executed by the feature amount difference calculation section 319 that is used in the sixth exemplary embodiment.

First, the feature amount difference calculation section 319 acquires a feature amount of the environment image (step 91). The feature amount of the environment image is the brightness standard deviation as discussed earlier, and is given from the feature amount calculation section 318.

Next, the feature amount difference calculation section 319 calculates a feature amount difference for each environment light map (step 92).

The feature amount difference is calculated by the following equation, for example.

Feature amount difference=(feature amount of environment image)−(feature amount of environment light map)

In the present exemplary embodiment, the feature amount difference is obtained by rounding off a calculated value to the second decimal place.

Figure 32:
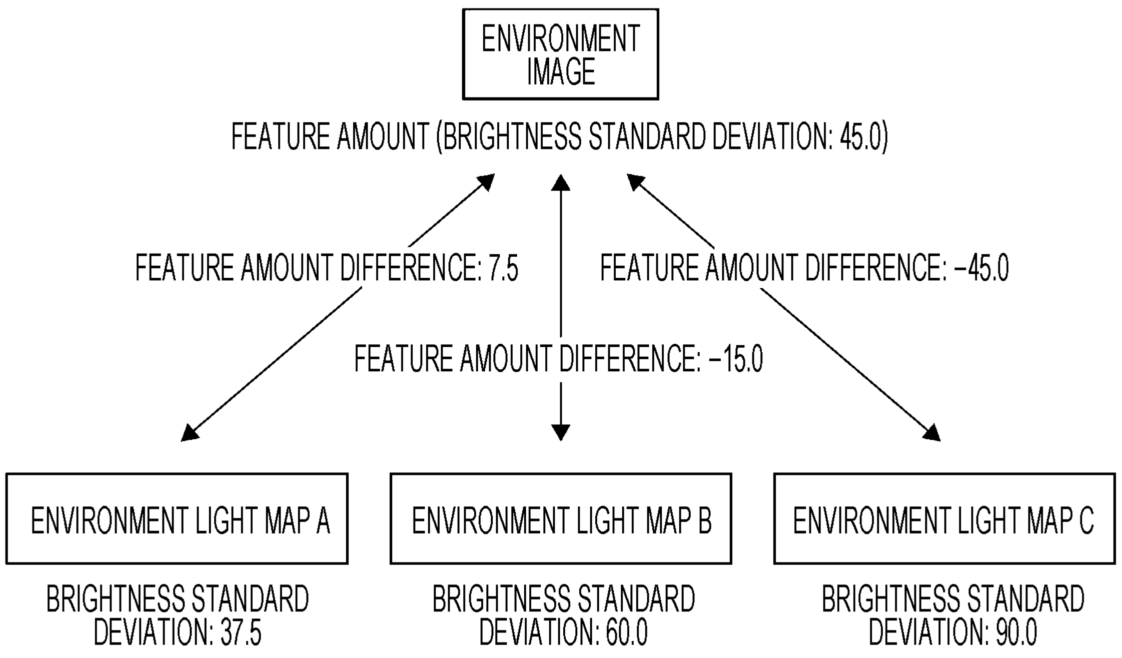
FIG. 32 illustrates an example of calculation of a feature amount difference.

FIG. 32 illustrates an example of calculation of a feature amount difference.

In FIG. 32, the feature amount of the environment image is 45.0.

In this case, the feature amount difference for the environment light map A is 7.5 (=45.0−37.5). The feature amount difference for the environment light map B is −15.0 (=45.0−60.0). The feature amount difference for the environment light map C is −45.0 (=45.0−90.0).

<Environment Light Map Selection Section>

The environment light map selection section 313C according to the present exemplary embodiment selects an environment light map, the absolute value of the feature amount difference calculated for which is the smallest, and outputs the selected environment light map to the glossiness reproduction section 314. In the example in FIG. 32, the environment light map A is selected.

While the brightness standard deviation of the illuminated portion is used as the feature amount in the present exemplary embodiment, the distortion degree of the illuminated portion may also be used.

The screen display illustrated in FIGS. 10 to 12 may also be adopted in the present exemplary embodiment. In the present exemplary embodiment, information on the brightness standard deviation etc. that is used to generate a glossiness reproduction image is displayed in place of the glossiness effect degree of the environment light map.

In the present exemplary embodiment, the principal illuminated portion of the environment light map that is used to calculate a feature amount may be presented. This presentation enables the user to verify setting of the principal illuminated portion.

Seventh Exemplary Embodiment

In the present exemplary embodiment, a case where the precision in selecting an environment light map is enhanced using information on the average brightness of an illuminated portion will be described on the basis of the print system 1 described in relation to the sixth exemplary embodiment discussed earlier.

In the present exemplary embodiment, as in the second exemplary embodiment discussed earlier, an average brightness of an environment image acquired by the environment image acquisition section 311 is calculated, and given to the environment light map selection section 313C (see FIG. 26).

The environment light map storage section 341C (see FIG. 26) stores a plurality of environment light maps with the same brightness standard deviation but with different average brightnesses of the illuminated portion. The environment light map collections may be given as collections of environment light maps with brightness standard deviations included in a numerical range determined in advance.

In this exemplary embodiment, the environment light map selection section 313C first specifies a plurality of environment light maps with a small feature amount difference as candidates to be selected.

Next, the environment light map selection section 313C selects an environment light map with an average brightness that is close to (or that is not significantly different from) the average brightness of the environment image, and outputs the selected environment light map to the glossiness reproduction section 314 (see FIG. 26).

Eighth Exemplary Embodiment

In the present exemplary embodiment, a case where the precision in selecting an environment light map is enhanced using information on the chromaticity of an illuminated portion will be described on the basis of the print system 1 described in relation to the sixth exemplary embodiment discussed earlier.

In the present exemplary embodiment, as in the third exemplary embodiment discussed earlier, the chromaticity of an environment image acquired by the environment image acquisition section 311 is calculated, and given to the environment light map selection section 313C (see FIG. 26).

The environment light map storage section 341C (see FIG. 26) stores a plurality of environment light maps with the same brightness standard deviation but with different chromaticities of the illuminated portion. The environment light map collections may be given as collections of environment light maps with brightness standard deviations included in a numerical range determined in advance.

Also in this exemplary embodiment, the environment light map selection section 313C first specifies a plurality of environment light maps with a small feature amount difference as candidates to be selected.

Next, the environment light map selection section 313C selects an environment light map with a chromaticity that is close to (or that is not significantly different from) the chromaticity of the environment image, and outputs the selected environment light map to the glossiness reproduction section 314 (see FIG. 26).

Ninth Exemplary Embodiment

In the present exemplary embodiment, a case where the selected environment light map is corrected will be described on the basis of the print system 1 described in relation to the sixth exemplary embodiment discussed earlier.

Also in the sixth exemplary embodiment, an environment light map with an illuminated portion with a brightness standard deviation that is close to that of the illuminated portion of the environment image is selected from among the environment light maps stored in the environment light map storage section 341C, there remain differences in the average brightness and the chromaticity.

Thus, also in the present exemplary embodiment, as in the fourth exemplary embodiment discussed earlier, the environment light map selected by the environment light map selection section 313C (see FIG. 26) is corrected to enable reproducing a glossiness using an environment light map that is close to the illumination environment at the observation location.

As described in relation to the fifth exemplary embodiment, the environment light map may be corrected for only the chromaticity.

Other Exemplary Embodiments (1) While exemplary embodiments of the present disclosure have been described above, the technical scope of the present disclosure is not limited to the exemplary embodiments discussed earlier. It is apparent from the following claims that a variety of modifications and improvements that may be made to the exemplary embodiments discussed earlier also fall within the technical scope of the present disclosure.

(2) While the function of generating an image that reproduces a glossiness at an observation location is executed by the print server 30 (see FIG. 1) connected to the client terminal 10 (see FIG. 1) through the network N in the exemplary embodiments discussed earlier, the terminal that executes the function is not limited to the print server 30.

For example, the function may be executed by the client terminal 10 or the image forming apparatus 20 (see FIG. 1). In this case, the client terminal 10 and the image forming apparatus 20 are examples of an information processing apparatus.

(3) While the print system 1 (see FIG. 1) is assumed in the exemplary embodiments discussed earlier, the present disclosure may be implemented as a so-called information processing system.

Figure 33:
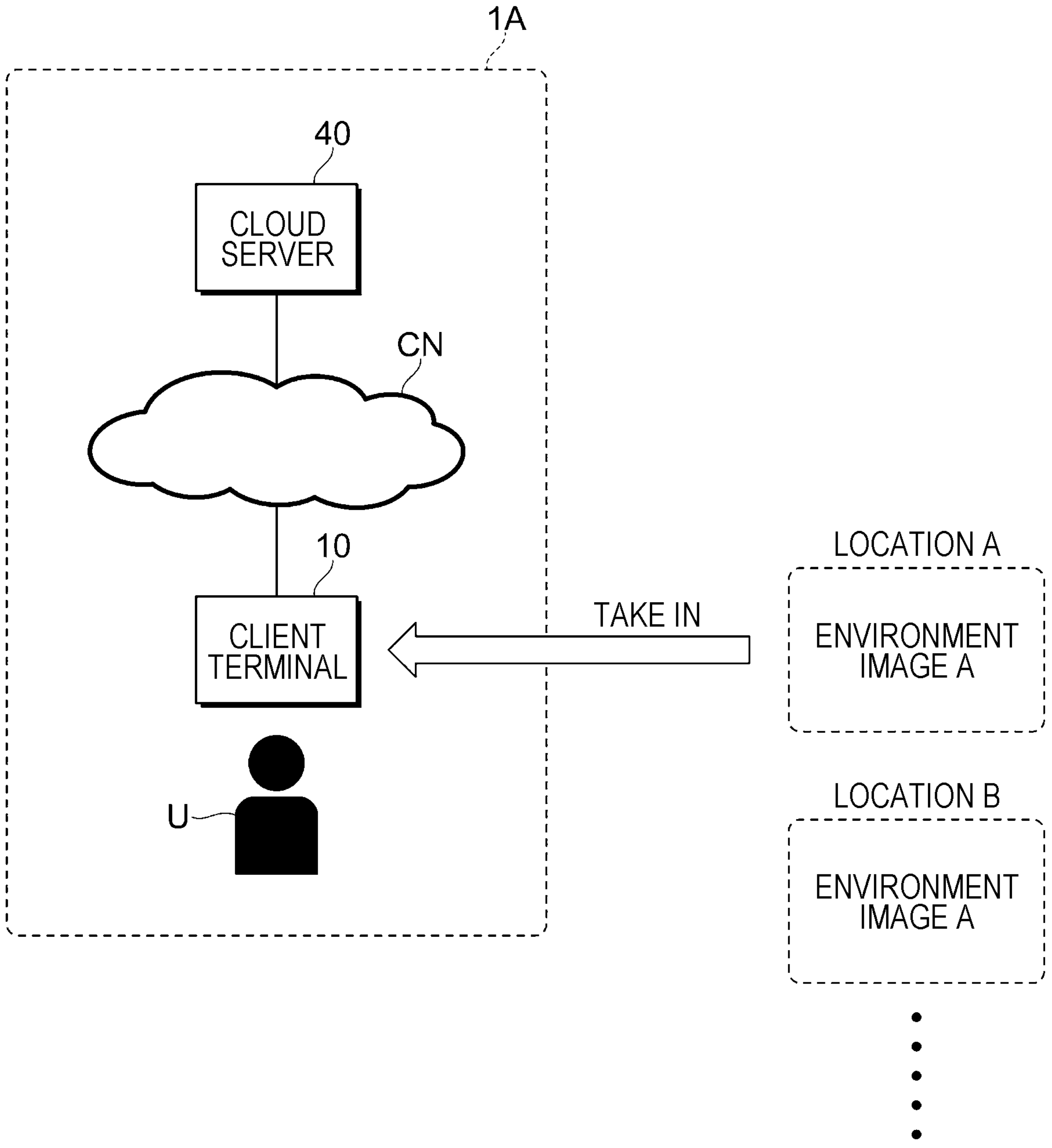
FIG. 33 illustrates an example of the configuration of an information processing system that is used in another exemplary embodiment.

FIG. 33 illustrates an example of the configuration of an information processing system 1A that is used in another exemplary embodiment. In FIG. 33, portions corresponding to those in FIG. 1 are denoted by corresponding reference signs.

The information processing system 1A illustrated in FIG. 33 is composed of the client terminal 10 and a cloud server 40. These are communicably connected to each other by way of a cloud network CN.

The cloud server 40 is also an example of an information processing apparatus. The hardware configuration of the cloud server 40 may be the same as the hardware configuration illustrated in FIG. 2.

The information processing system 1A illustrated in FIG. 33 is different from the print system 1 illustrated in FIG. 1 in that an image is not formed by the image forming apparatus 20 (see FIG. 1).

In the present exemplary embodiment, the processing functions according to the first to ninth exemplary embodiments discussed earlier are implemented through execution of a program on the cloud server 40.

While the cloud server 40 is prepared in FIG. 33, the functions may be executed by the client terminal 10 alone.

A mobile communication system such as 4G or 5G may be used in place of the cloud network CN.

(4) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising a processor configured to: acquire a feature amount related to brightness distribution from a first image captured at an observation location; select an environment light map that is similar to the feature amount, from among a plurality of environment light maps prepared in advance; and control expression of a second image corresponding to an article observed at the observation location using the selected environment light map.

(((2)))

The information processing apparatus according to (((1))), wherein the processor is configured to select a first environment light map that is similar to an average brightness of the first image, from among a plurality of environment light maps that are similar to the feature amount, and control expression of the second image using the first environment light map.

(((3)))

The information processing apparatus according to (((2))), wherein the processor is configured to generate a second environment light map that is closer to the average brightness of the first image by correcting the first environment light map, and control expression of the second image using the second environment light map.

(((4)))

The information processing apparatus according to (((1))), wherein the processor is configured to select a first environment light map that is similar to a chromaticity of the first image, from among a plurality of environment light maps that are similar to the feature amount, and controls expression of the second image using the first environment light map.

(((5)))

The information processing apparatus according to (((4))), wherein the processor is configured to generate a second environment light map that is closer to the chromaticity of the first image by correcting the first environment light map, and control expression of the second image using the second environment light map.

(((6)))

The information processing apparatus according to any one of (((1))) to (((5))), wherein the processor is configured to display an index that represents a gloss degree of the environment light map that is used to generate the second image, the index being displayed in association with the second image.

(((7)))

The information processing apparatus according to any one of (((1))) to (((5))), wherein the processor is configured to display the environment light map that is used to generate the second image, the environment light map being displayed in association with the second image.

(((8)))

The information processing apparatus according to any one of (((1))) to (((5))), wherein the processor is configured to display one or more environment light maps that are similar to the feature amount of the first image, the one or more environment light maps being displayed in association with the second image.

(((9)))

The information processing apparatus according to (((1))), wherein the processor is configured to acquire the feature amount from an illuminated portion of the first image.

(((10)))

A program causing a computer to execute a process comprising: acquiring a feature amount related to brightness distribution from a first image captured at an observation location; selecting an environment light map that is similar to the feature amount, from among a plurality of environment light maps prepared in advance; and controlling expression of a second image corresponding to an article observed at the observation location using the selected environment light map.

What is claimed is:

1. An information processing apparatus comprising:

a processor configured to:

acquire a glossiness effect degree calculated as a standard deviation of brightness of a first image captured at an observation location;

select an environment light map that is similar to the glossiness effect degree and at least one of average brightness of the first image or chromaticity of the first image, from among a plurality of environment light maps prepared in advance;

generate a generated environment light map that is further closer to the at least one of the chromaticity or the average brightness of the first image by correcting the selected environment light map; and control expression of a second image corresponding to an article observed at the observation location using the generated environment light map.

2. The information processing apparatus according to claim 1, wherein the processor is configured to display an index that represents the glossiness effect degree, the index being displayed in association with the second image.

3. The information processing apparatus according to claim 1, wherein the processor is configured to display the environment light map that is used to generate the second image, the environment light map being displayed in association with the second image.

4. The information processing apparatus according to claim 1, wherein the processor is configured to display one or more environment light maps that are similar to glossiness effect degree and at least one of average brightness of the first image or chromaticity of the first image, the one or more environment light maps being displayed in association with the second image.

5. The information processing apparatus according to claim 1, wherein the processor is configured to acquire the glossiness effect degree and at least one of average brightness of the first image or chromaticity of the first image from an illuminated portion of the first image.

6. An information processing method comprising:

acquiring a glossiness effect degree calculated as a standard deviation of brightness of a first image captured at an observation location;

selecting an environment light map that is similar to glossiness effect degree and at least one of average brightness of the first image or chromaticity of the first image, from among a plurality of environment light maps prepared in advance;

generating a generated environment light map that is further closer to the at least one of the chromaticity or the average brightness of the first image by correcting the selected environment light map; and controlling expression of a second image corresponding to an article observed at the observation location using the generated environment light map.

7. A non-transitory computer readable medium storing a program causing a computer to execute a process comprising:

acquiring a glossiness effect degree calculated as a standard deviation of brightness of a first image captured at an observation location;

selecting an environment light map that is similar to glossiness effect degree and at least one of average brightness of the first image or chromaticity of the first image, from among a plurality of environment light maps prepared in advance;

generating a generated environment light map that is further closer to the at least one of the chromaticity or the average brightness of the first image by correcting the selected environment light map; and controlling expression of a second image corresponding to an article observed at the observation location using the generated environment light map.

* * * * *